United States Patent
Eisenhauer

(10) Patent No.: US 6,389,910 B1
(45) Date of Patent: May 21, 2002

(54) TRANSMISSION PATH TORQUE TRANSDUCER

(75) Inventor: Karl Yarnos Eisenhauer, Berowra Heights (AU)

(73) Assignee: Bishop Innovation Pty. Limited, North Ryde (AU)

( * ) Notice: Subject to any disclaimer, the term of this patent is extended or adjusted under 35 U.S.C. 154(b) by 0 days.

(21) Appl. No.: 09/498,644

(22) Filed: Feb. 7, 2000

Related U.S. Application Data

(63) Continuation-in-part of application No. PCT/AU98/01035, filed on Dec. 15, 1998.

(51) Int. Cl.[7] .................................................. G01L 3/02
(52) U.S. Cl. ................................................. 73/862.193
(58) Field of Search ..................... 73/862.193, 862.324, 73/862.33; 364/424.05; 250/237

(56) References Cited

U.S. PATENT DOCUMENTS

| | | | |
|---|---|---|---|
| 4,433,585 A | * 2/1984 | Levine | 73/862.34 |
| 4,641,027 A | * 2/1987 | Renner et al. | 250/237 |
| 4,693,123 A | * 9/1987 | Bacardit | 73/862.33 |
| 5,369,583 A | * 11/1994 | Hazelden | 364/424.05 |
| 5,606,137 A | * 2/1997 | Penketh | 73/862.324 |

FOREIGN PATENT DOCUMENTS

| | | |
|---|---|---|
| DE | 2118722 | 11/1972 |
| EP | 0340172 | 11/1989 |
| GB | 417051 | 9/1934 |
| GB | 2191287 | 12/1987 |
| WO | 96/06330 | 2/1996 |

* cited by examiner

*Primary Examiner*—Max Noori
*Assistant Examiner*—Jewel Thompson
(74) *Attorney, Agent, or Firm*—Arent Fox Kintner Plotkin & Kahn, PLLC

(57) ABSTRACT

A torque transducer comprises a rotating shaft having first and second torque input members connected by a torsionally compliant coupling thereby enabling angular deflection of the torque input members relative to each other as a function of the magnitude of the torque in the shaft. The transducer has an EMR source and an array of EMR sensitive detectors. Each of the torque input members has a grating zone with alternating regions of high and low transmissibility to the EMR. The grating zone resides in the transmission path communicating EMR from the source to the array. A pattern is produced by incident EMR on the array resulting from the alternating regions of high and low transmissibility of the grating zones residing in the transmission path to the array. The pattern on the array is processed to derive the relative angular deflection of the torque input members and provides a measure of the magnitude of the torque in the shaft.

26 Claims, 21 Drawing Sheets x x

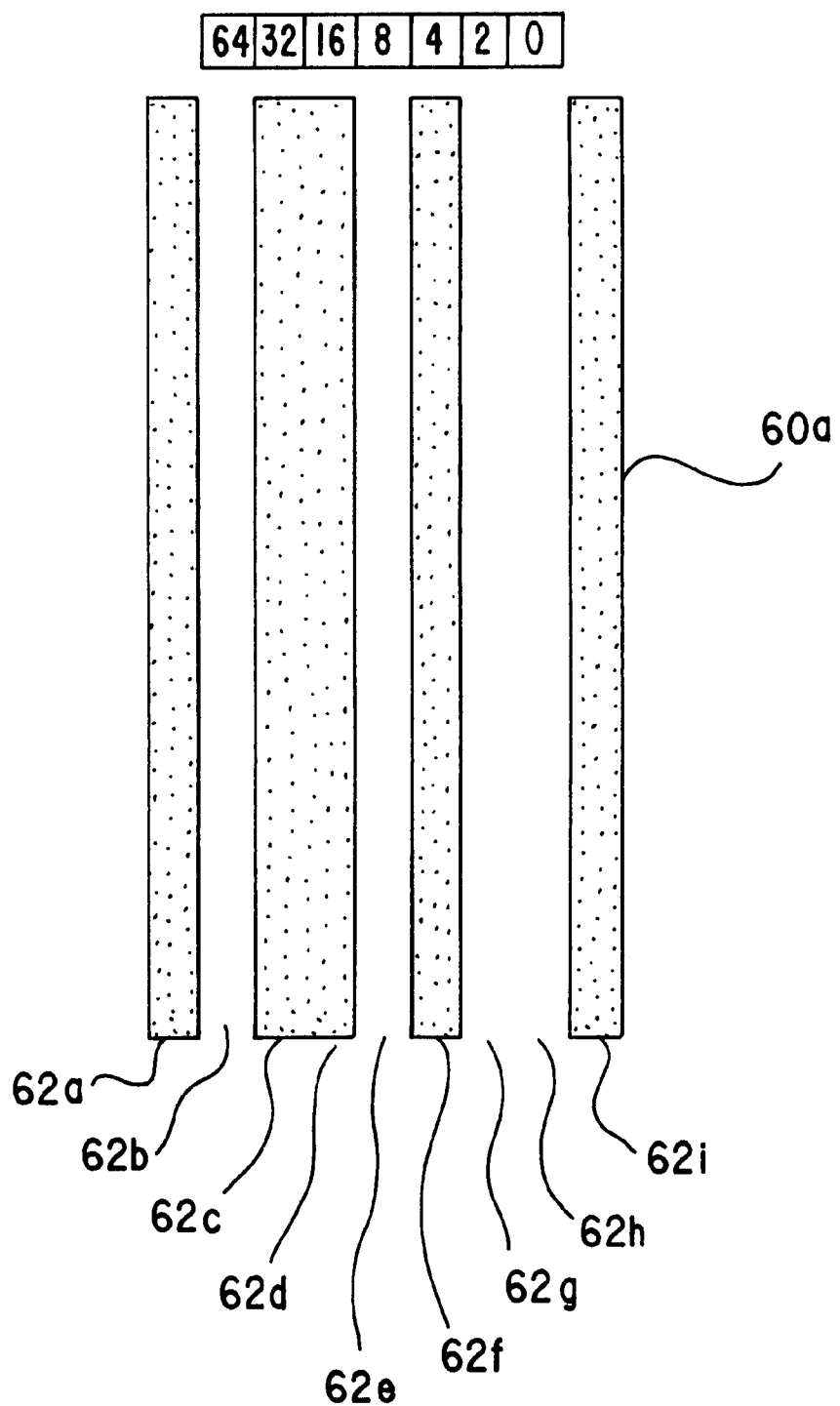

TRANSMISSION PATH TORQUE TRANSDUCER

CROSS REFERENCE TO RELATED APPLICATION

This application is a continuation-in-part of International Application PCT/AU98/01035, filed Dec. 15, 1998, and designating the U.S.

This invention relates to torque transducers for measuring the magnitude of torque in shafts, in particular rotating shafts such as found in electric power steering systems in vehicle applications.

BACKGROUND

Electric power steering systems conventionally incorporate an input shaft element, connected via an intermediate shaft and Hookes joint arrangement to the steering wheel. The input shaft therefore needs to rotate through an angle typically one to two revolutions either side of the on-centre steering position. The input shaft is at least partially surrounded by the fixed housing of the steering gear. It is a requirement of the electric power steering servo system to accurately measure the continuously varying torque in this rotating shaft. Conventionally torque applied to the shaft causes it to angularly deflect, such deflection causing one part of the shaft to angularly displace with respect to another part, and this displacement is sensed to provide a measurement of this torque.

The sensing means needs to allow for rotation of the shaft within the housing, usually employing non-contact or mechanical signal transmission means. Non-contact means include optical aperture based devices and magnetic devices such as magnetostrictive or variable reluctance couplings. Mechanical means include slidably connected potentiometers and other indicating devices.

To improve the accuracy of such sensing means a torsionally compliant coupling in the form of a torsion bar is used to connect two input members at either end of the shaft. When torque is applied between the two input members the torsion bar deflects causing an increased angular displacement, which allows the use of less sensitive, or less accurate sensing means.

Generally, the use of a torsion bar requires the use of a failsafe mechanism, being a torque-limiting device to prevent failure of the torsion bar when unavoidable torque overload conditions occur.

Such torque limiting devices are well known in the art of vehicle steering, and will therefore not be described in this specification.

The prior art, which is most closely related to that of the present invention, is described in U.S. Pat. No. 5,369,583 (Hazelden) and International Patent Application No. PCT/GB95/02017 (Lucas Industries plc) which show sensors employing optical disc apertures for measuring torque.

The essence of the present invention resides in the provision of multiple electro-magnetic radiation (EMR) transmission paths incorporating grating zones composed of alternating regions of high and low transmissivity. The grating zones reside in grating elements connected by a torsionally compliant coupling, and only one grating zone resides in any one transmission path.

These transmission paths are connected to a source of electro-magnetic radiation (EMR), typically UV, visible or IR light, which is modulated as it passes through the grating zones. The modulated EMR then generates patterns on one or more arrays of detectors sensitive to the EMR. Arrays include Charge Couple Devices (CCD), Very Large Scale Integration (VLSI) vision chips, one and two-dimensional photodetector arrays and lateral effect photodiodes (commonly referred to as PSD's or position sensitive devices). The disposition of the patterns is a function of torque applied to the shaft, and the output of the one or more arrays can be processed to produce a measure of the torque applied to the shaft. The grating zones can be arranged axially or radially about the axis of rotation of the shaft, and are of such a nature to allow a continuous output of the arrays regardless of the angular position or angular velocity of the shaft, as the limited array dimensions may not allow the complete circumference or radial face to be viewed by the arrays at any instant in time. The advantages of such a construction over that disclosed in U.S. Pat. No. 5,369,583 and International Patent Application Number PCT/GB95/02017 may arise as one or more of the following:

Firstly, as only one grating zone resides in any one transmission path, it is possible to use multiple arrays, where each grating zone creates a separate pattern on one or more arrays. Thus, for example when using two grating zones and two respective arrays, twice as much detail can be included in the patterns generated compared to a single array of the same size and resolution. This makes the use of barcode patterns feasible, which, by eliminating indeterminacy caused by aliasing, reduces the mechanical complexity and assembly accuracy required.

Secondly, the use of more than one grating zone allows the zones to be placed side by side, for example in a radial or a cylindrical configuration. Thus, the two zones can be manufactured sequentially or simultaneously in a continuous manufacturing operation after the assembly of the grating elements and torsion bar. This means that much improved relative alignment of the zones can be achieved, as subsequent assembly and calibration is not required.

Thirdly, as the zones can be placed side by side, the distance between the zone and arrays can be made much smaller, minimising the inevitable loss of accuracy due to diffraction of the EMR from the boundaries of the regions of high and low transmissivity. The invention disclosed in the prior art necessarily has one zone (called slots or apertures in the prior art) located further from the array by at least the thickness of the discs in which the slots reside.

Fourthly, as the distance between the zone and arrays can be minimised, scattering effects can be reduced to a level that allows the use of non-collimated EMR sources, without focussing optical devices. This significantly reduces the complexity, assembly alignment requirements and cost of the transducer.

Finally, the location of the grating elements side by side allows the use of well known and accurate photographic or metallising techniques, for example metal on glass without excessive loss of resolution. The use of these techniques with overlapping zones (slots or apertures) as described in the prior art may result in a larger loss of resolution or other problems from internal reflection, diffraction or degradation over time as the EMR has to travel through multiple zones with attendant attenuation or diffraction for each zone.

SUMMARY OF INVENTION

The present invention consists in a torque transducer comprising a rotating shaft at least partially surrounded by a fixed housing, the axis of rotation of the shaft fixed with respect to the housing, the shaft comprising first and second substantially rigid torque input members which are connected by a torsionally compliant coupling, the coupling thereby enabling angular deflection of the first torque input member relative to the second torque input member as a function of the magnitude of the torque in the shaft, the transducer also comprising one or more electro-magnetic radiation (EMR) sources and one or more arrays of EMR sensitive detectors, a first grating element attached to the first torque input member and a second grating element attached to the second torque input member, the first and second grating elements each comprising a grating zone, each grating zone comprising alternating regions of high and low transmissibility to the EMR, characterised in that only one grating zone of one grating element resides in the transmission path communicating EMR from any source to any array, a pattern is produced by incident EMR on each of the one or more arrays resulting from the alternating regions of high and low transmissibility of the one or more grating zones residing in the one or more transmission paths to that array, the pattern or patterns on the one or more arrays is processed by a processor to derive the relative angular deflection of the first and second torque input members and hence provide a measure of the magnitude of the torque in the shaft.

It is preferred that at least one of the grating elements further comprises a medium substantially transparent to the EMR, the transmission path communicating EMR from any source to any array comprises a path commencing at the respective source, passing through a first boundary of the medium, optically communicating through the medium, then exiting through a second boundary of the medium and terminating at the respective array, the grating zone interfacing with either of the first or second boundaries.

Preferably, the transducer comprises two transmission paths, each path commencing at a separate source, passing through a respective grating zone, and terminating at a separate array.

Alternatively, in certain applications, the transducer comprises two sets of transmission paths, each set comprising two or more transmission paths commencing at two or more separate sources, each set of transmission paths passing through a respective grating zone, and terminating at a separate array.

Alternatively, in certain applications, the transducer comprises two transmission paths, each path commencing at a common source, passing through the respective grating zone, and terminating at a separate array.

Alternatively, in certain applications, the transducer comprises two transmission paths, each path commencing at a separate source, passing through a respective grating zone, and terminating at a common array.

Alternatively, in certain applications, the transducer comprises two transmission paths, each path commencing at a common source, passing through a respective grating zone, and terminating at a common array.

Alternatively, in certain applications, the transducer comprises two sets of transmission paths, each set comprising two or more transmission paths commencing at two or more separate sources, each set of transmission paths passing through a respective grating zone, and terminating at a common array.

Preferably the first boundary is disposed substantially radially with respect to the axis of rotation of the shaft, and the EMR emitted by the respective source is emitted in a substantially axial direction, parallel to the axis of rotation of the shaft.

Alternatively the first boundary is substantially cylindrical with a central axis collinear with the axis of rotation of the shaft, and the EMR emitted by the respective source is emitted in a substantially radial direction, perpendicular to the axis of rotation of the shaft.

Preferably the second boundary is substantially cylindrical with a central axis collinear with the axis of rotation of the shaft, and the respective array is positioned adjacent to this boundary.

Alternatively the second boundary is disposed substantially radially with respect to the axis of rotation of the shaft, and the respective array is positioned adjacent to this boundary.

Preferably the pattern or patterns is also processed by the processor to derive the angular velocity of at least one of the torque input members.

Preferably the pattern or patterns is also processed by the processor to derive the relative angular position of at least one of the torque input members.

Preferably the at least one grating zone includes features or additional regions of high or low transmissibility whose resulting pattern is also processed to derive the absolute angular position of the torque input member to which the respective grating element is attached.

In one embodiment, the at least one grating zone is arranged in the form of a succession of bar codes, and the resulting pattern on the respective array is processed to derive the absolute angular position of at least one of the torque input members.

Preferably, the resulting pattern on the respective array is processed to derive the absolute angular position of both of the torque input members and the difference in absolute angular position of the first and second torque input members is processed to provide a measure of the magnitude of the torque in the shaft.

Preferably the array comprises a one dimensional or a two dimensional array, a CCD, a VLSI vision chip or a lateral effect photodiode.

Preferably the transparent medium comprises a polymer, glass or ceramic material.

Preferably the grating zones comprise a metallic coating on the first or second boundaries.

Alternatively the grating zones comprise a coating deposited by a photolithographic process on the first or second boundaries.

Alternatively the grating zones comprise physical or chemical modification of the medium.

Preferably the transducer comprises two transmission paths, both grating elements comprising a medium substantially transparent to the EMR and at least one of the transmission paths passing through the mediums of both grating elements, but only passing through one grating zone. Preferably one of the two transmission paths passes through at least four boundaries, at least two boundaries associated with the medium of the first grating element and at least two boundaries associated with the medium of the second grating element, the one grating zone interfacing with only one of these at least four boundaries.

Preferably the transducer comprises two transmission paths, each of which passes through the first or second boundary of one grating element.

BRIEF DESCRIPTION OF DRAWINGS

The present invention will now be described by way of example with reference to the accompanying drawings, in which:

FIG. 12 shows details of the regions of high and low transmissivity on one of the bar codes shown in FIGS. 11a–e.

MODE OF CARRYING OUT INVENTION

Figure 1:
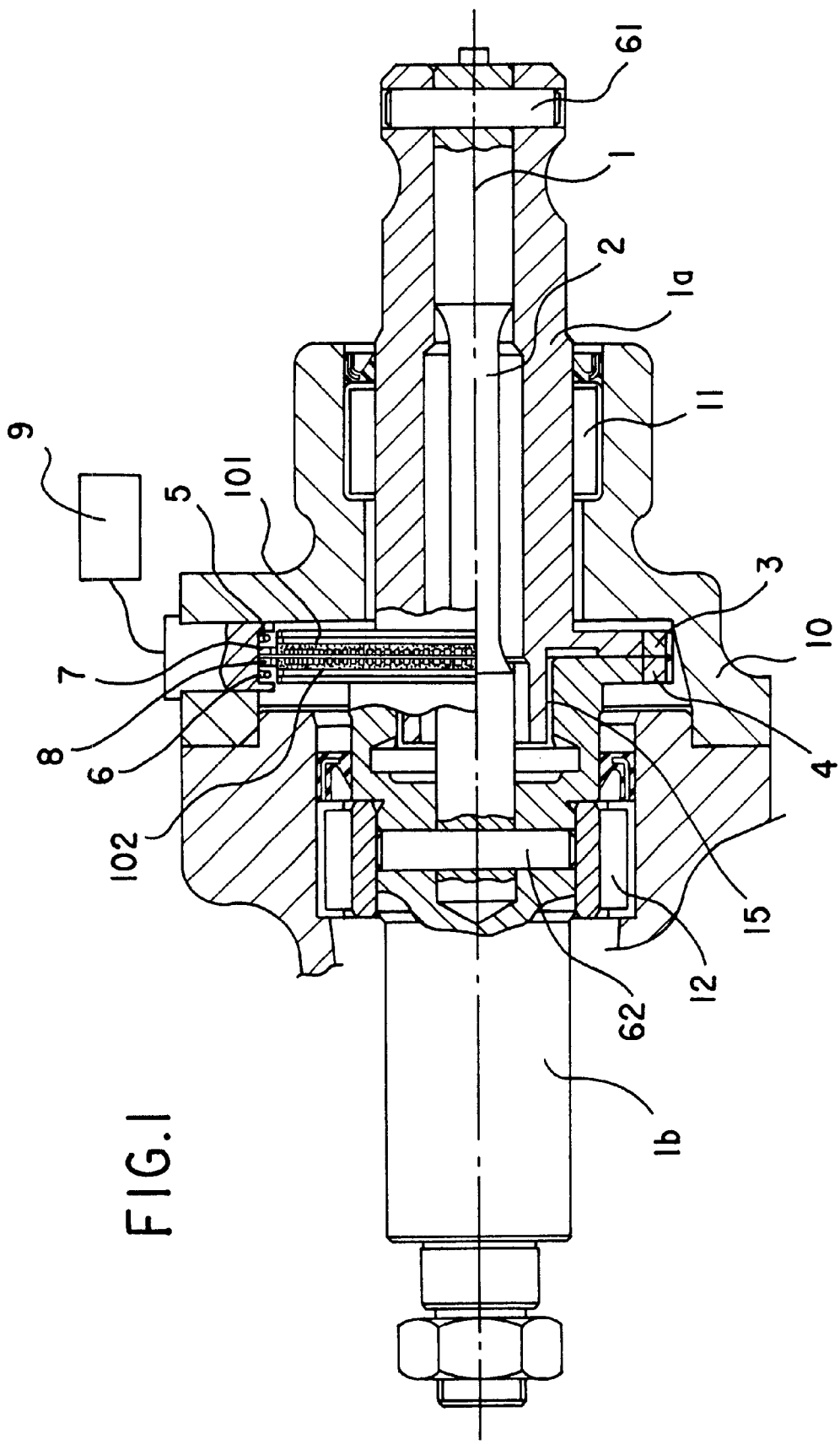
FIG. 1 is a cross sectional view of a torque transducer according to a first embodiment of the present invention, showing the shaft assembly comprising two torque input members connected by a torsion bar, two grating elements with grating zones and associated arrays and EMR sources, where the first and second boundaries are substantially cylindrical with a central axis collinear with the axis of rotation of the shaft.
Figure 2:
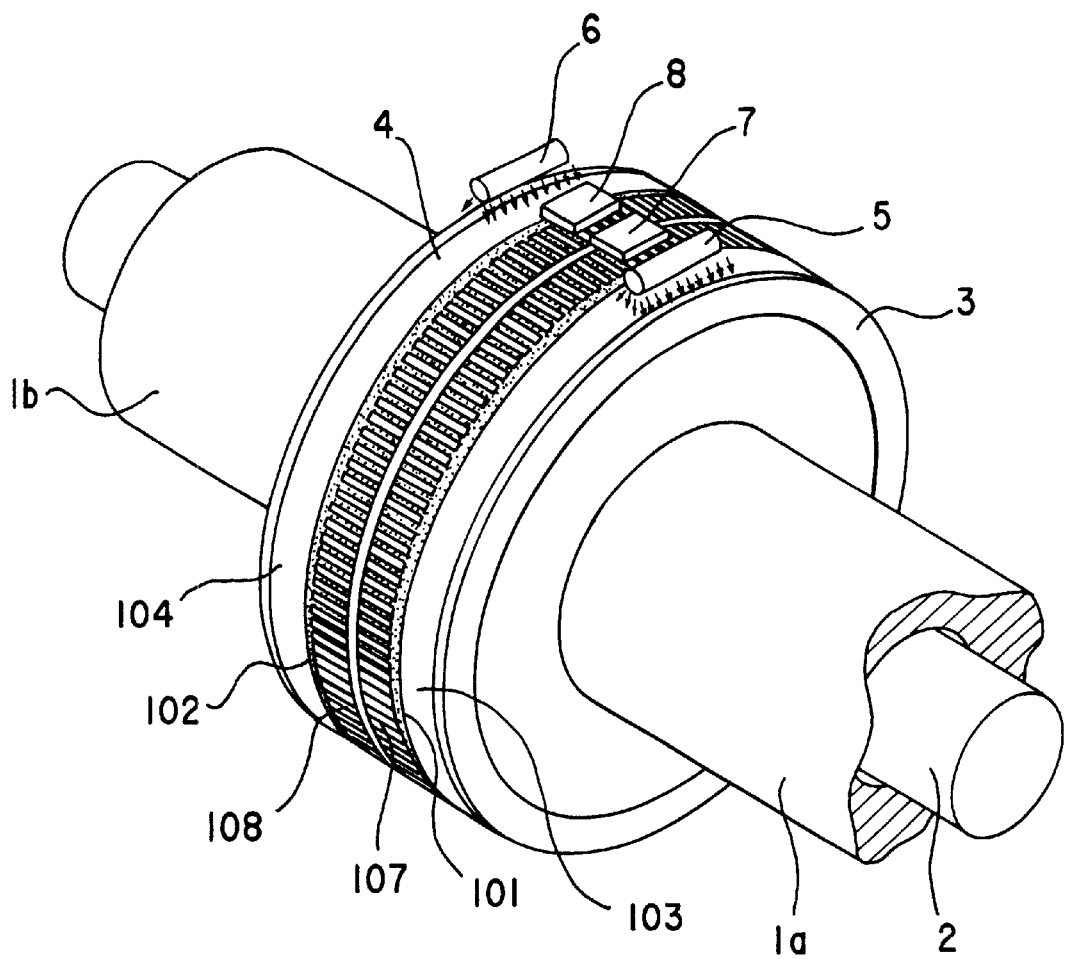
FIG. 2 is a detailed diagrammatic view of two torque input members connected by a torsion bar shown in FIG. 1, showing the EMR sources, grating zones and the associated arrays.
Figure 3:
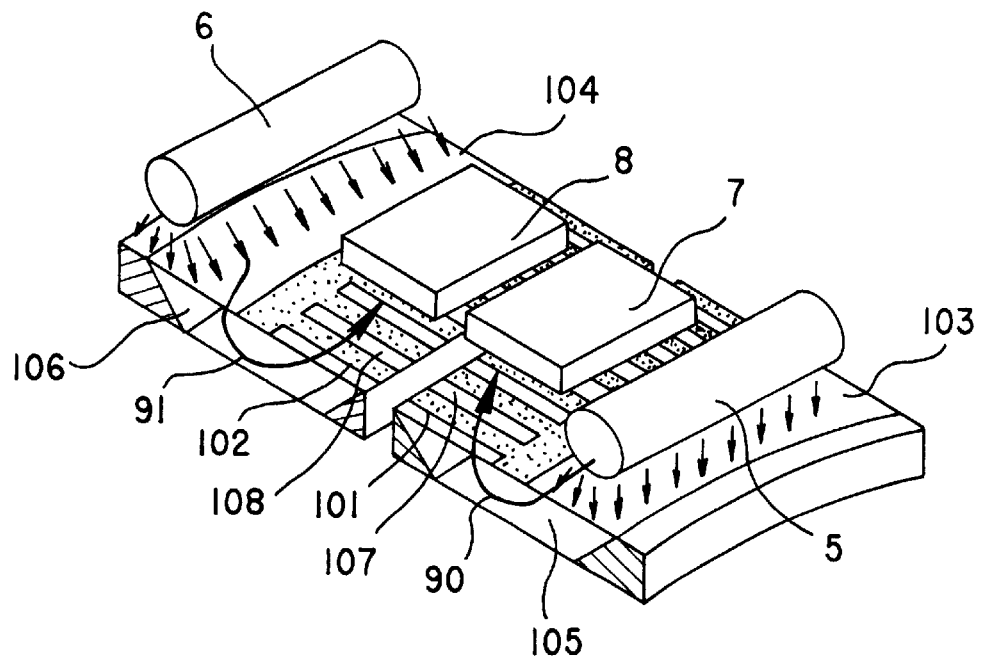
FIG. 3 is a partial view of FIG. 2 showing one grating element and the relationship of the boundaries, grating zone, EMR source and the associated array.

FIGS. 1, 2, and 3 are views of a torque transducer according to a first embodiment of the present invention. FIGS. 1 and 2 are respectively a cross section and a perspective view of the transducer. FIG. 3 is an expanded view of a portion of one grating element illustrating the grating element construction.

Substantially cylindrical grating elements 3 and 4 are attached to torque input members 1a and 1b of the shaft and connected at either end by a torsionally compliant coupling in the form of torsion bar 2. Grating elements 3 and 4 are disposed with a central axis collinear with axis of rotation 1 of the shaft and comprise grating zones 101 and 102 respectively. Torque input members 1a and 1b and torsion bar 2 are connected via cross pins 61 and 62. The assembly is enclosed in housing 10 and supported by bearings 11 and 12. Transmission paths 90 and 91 for Electro-magnetic Radiation (EMR) commence at each EMR sources 5 and 6, and pass in turn through respective first boundaries 103 and 104, respective mediums 105 and 106, respective second boundaries 107 and 108, respective grating zones 101 and 102 which interface with respective second boundaries 107 and 108 and terminate at respective arrays 7 and 8. EMR passing through the medium is able to change direction due to internal reflection in the manner employed by "light guides" which are commonly used to guide EMR along a specific path, for example in illuminated instrument panels in automobiles. In other (not shown) embodiments either or both of grating zones 101 and 102 of respective grating elements 3 and 4 may alternatively interface with the respective first boundaries 103 and 104, hence the order of first boundaries 103 and 104, second boundaries 107 and 108 and grating zones 101 and 102 in transmission paths 90 and 91 may differ from that described in reference to FIGS. 1–3. However, in all embodiments only one grating zone of one grating element resides in each respective transmission path communicating EMR from the respective source to the respective array. EMR sources 5 and 6 are disposed to provide EMR in a substantially radial direction with respect to axis of rotation 1 of the shaft, and illuminate respective transmission paths 90 and 91. Arrays 7 and 8 of EMR sensitive detectors are disposed to receive EMR from transmission paths 90 and 91 in a substantially radial direction with respect to axis of rotation 1 of the shaft and the patterns thus generated on arrays 7 and 8 are precessed by processor 9. When torque is applied between torque input members 1a and 1b torsion bar 2 angularly deflects, resulting in a displacement of one pattern with respect to the other. Fail-safe mechanism 15 limits the maximum torque carried by torsion bar 2 by providing a limit to the amount of angular deflection of torque input member 1a with respect to torque input member 1b. Such a failsafe mechanism is well known in the art of power steering and is not described here. The methods by which the images are processed are well known in the art of image analysis, and some of these methods used are described in "VISION CHIPS: Implementing Vision Algorithms with Analog VLSI Circuits", by Christof Koch and Hua Li, IEEE Computer Society Press, ISBN 0-8186-6492-4. Suitable arrays include linear photodetector arrays such as device TSL1410 manufactured by Texas Instruments Inc.

FIGS. 4a, 4b, 4c, 4d, 4e and 4f are schematics of alternative transmission paths. In each case shown the transmission paths pass through grating elements comprising respective first boundaries 103 and 104, respective mediums 105 and 106, respective second boundaries 107 and 108 and respective grating zones 101 and 102.

Figure 4A:
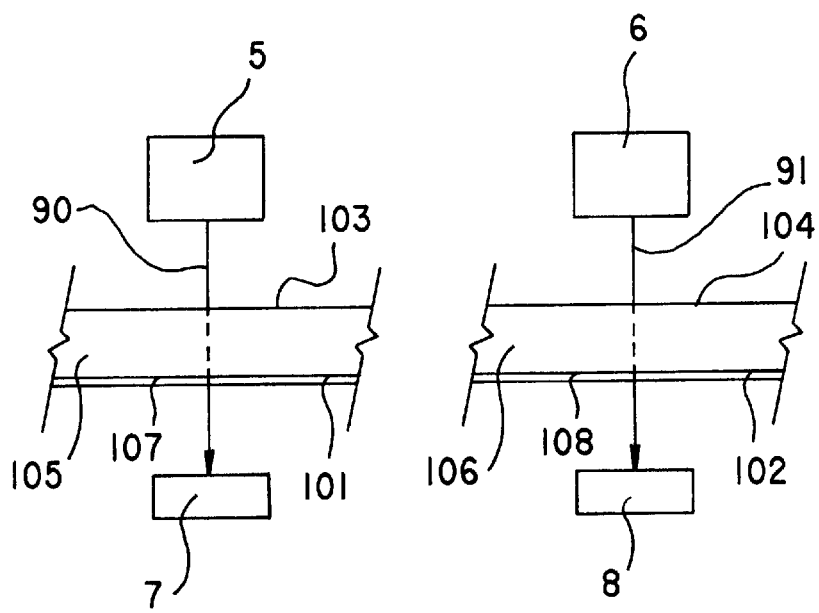
FIG. 4a, 4b, 4c, 4d, 4e and 4f are schematic diagrams illustrating alternative transmission paths.

FIG. 4a illustrates a transducer comprising two transmission paths 90 and 91, where each respective path commences at separate EMR sources 5 and 6, passes separately in turn through respective first boundaries 103 and 104, respective mediums 105 and 106, respective second boundaries 107 and 108, respective grating zones 101 and 102 which interface with respective second boundaries 107 and 108 and terminates at respective individual arrays 7 and 8.

Figure 4B:
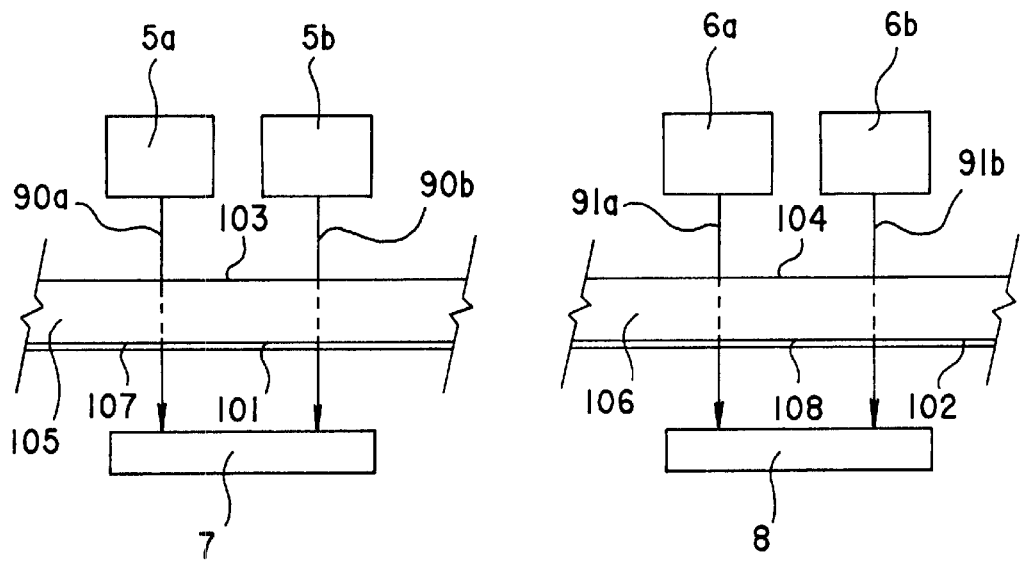

FIG. 4b illustrates a transducer comprising two sets of transmission paths, each set comprising two transmission paths 90a and 90b, and 91a and 91b respectively, where each path commences at separate EMR sources 5a and 5b, and 6a and 6b respectively, then passes separately in turn through respective first boundaries 103 and 104, respective mediums 105 and 106, respective second boundaries 107 and 108, respective grating zones 101 and 102 which interface with respective second boundaries 107 and 108 and terminates at respective individual arrays 7 and 8 for each set.

Figure 4C:
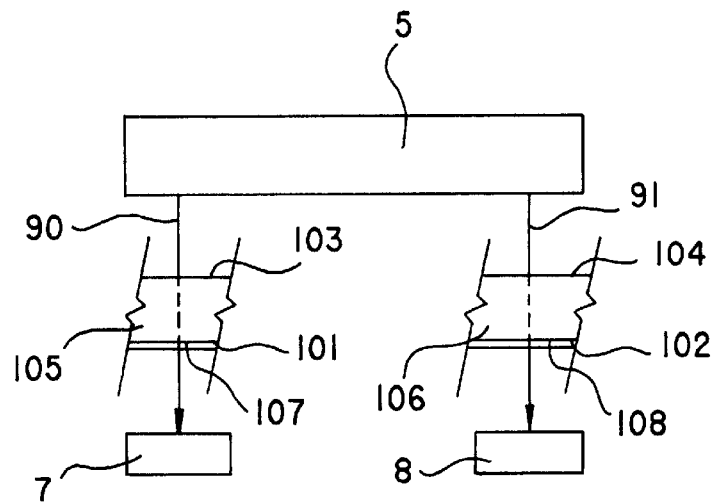

FIG. 4c illustrates a transducer comprising two transmission paths 90 and 91, where each respective path commences at a common source 5, then passes separately in turn through respective first boundaries 103 and 104, respective mediums 105 and 106, respective second boundaries 107 and 108, respective grating zones 101 and 102 which interface with respective second boundaries 107 and 108 and terminates at the respective individual arrays 7 and 8.

Figure 4D:
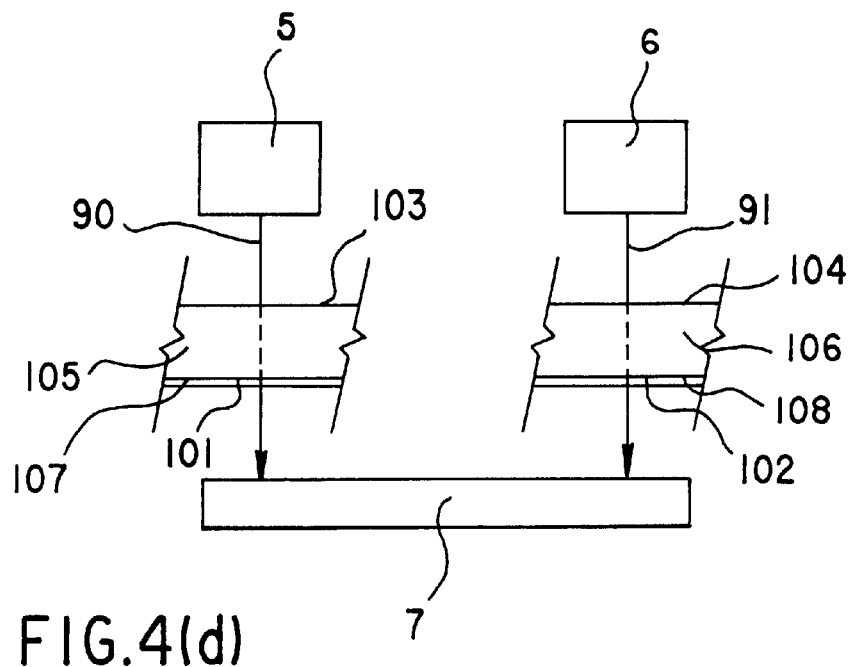

FIG. 4d illustrates a transducer comprising two transmission paths 90 and 91, where each path commences at respective separate sources 5 and 6, then passes separately in turn through respective first boundaries 103 and 104, respective mediums 105 and 106, respective second boundaries 107 and 108, respective grating zones 101 and 102 which interface with respective second boundaries 107 and 108 and terminates at common array 7.

Figure 4E:
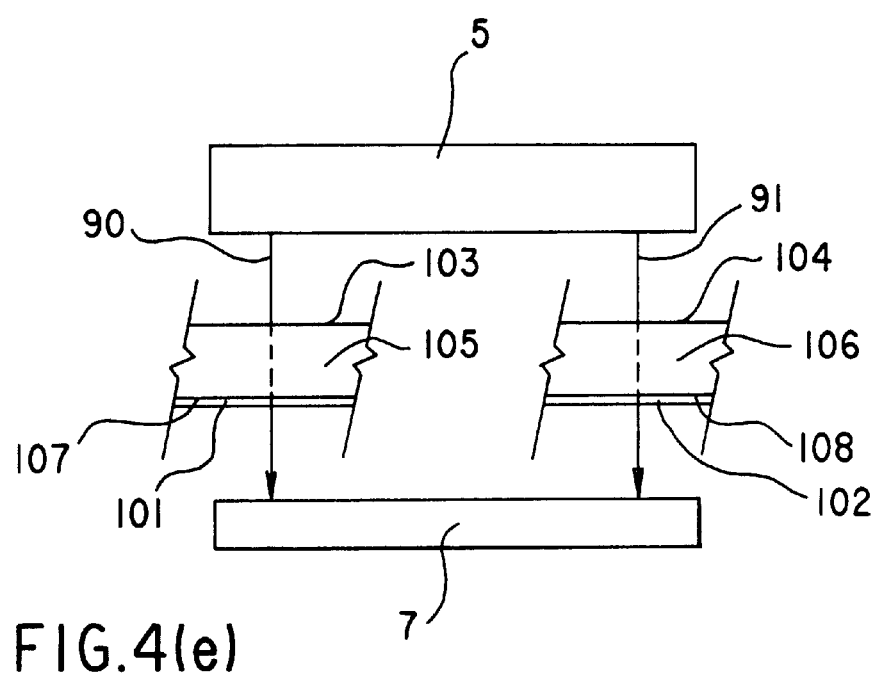

FIG. 4e illustrates a transducer comprising two transmission paths 90 and 91, where each path commences at a respective common source 5, then passes separately in turn through respective first boundaries 103 and 104, respective mediums 105 and 106, respective second boundaries 107 and 108, respective grating zones 101 and 102 which interface with respective second boundaries 107 and 108 and terminates at common array 7.

Figure 4F:
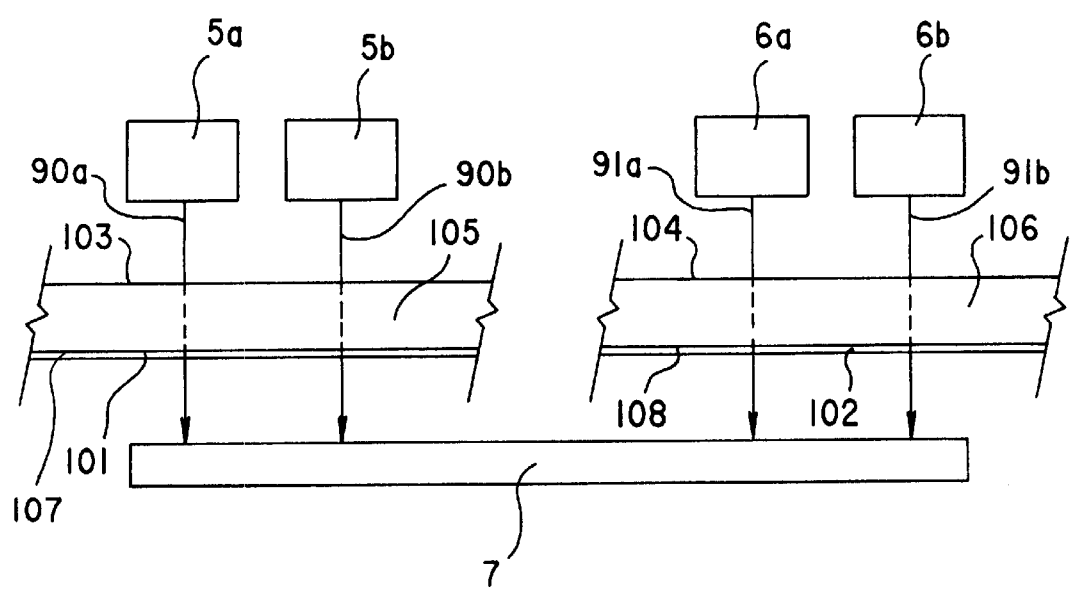

FIG. 4f illustrates a transducer comprising two sets of transmission paths, each set comprising two transmission paths 90a and 90b, and 91a and 91b respectively, where each path commences at separate EMR sources 5a and 5b and 6a and 6b respectively, then passes separately in turn through respective first boundaries 103 and 104, respective mediums 105 and 106, respective second boundaries 107 and 108, respective grating zones 101 and 102 which interface with respective second boundaries 107 and 108 and terminates at common array 7.

Figure 5:
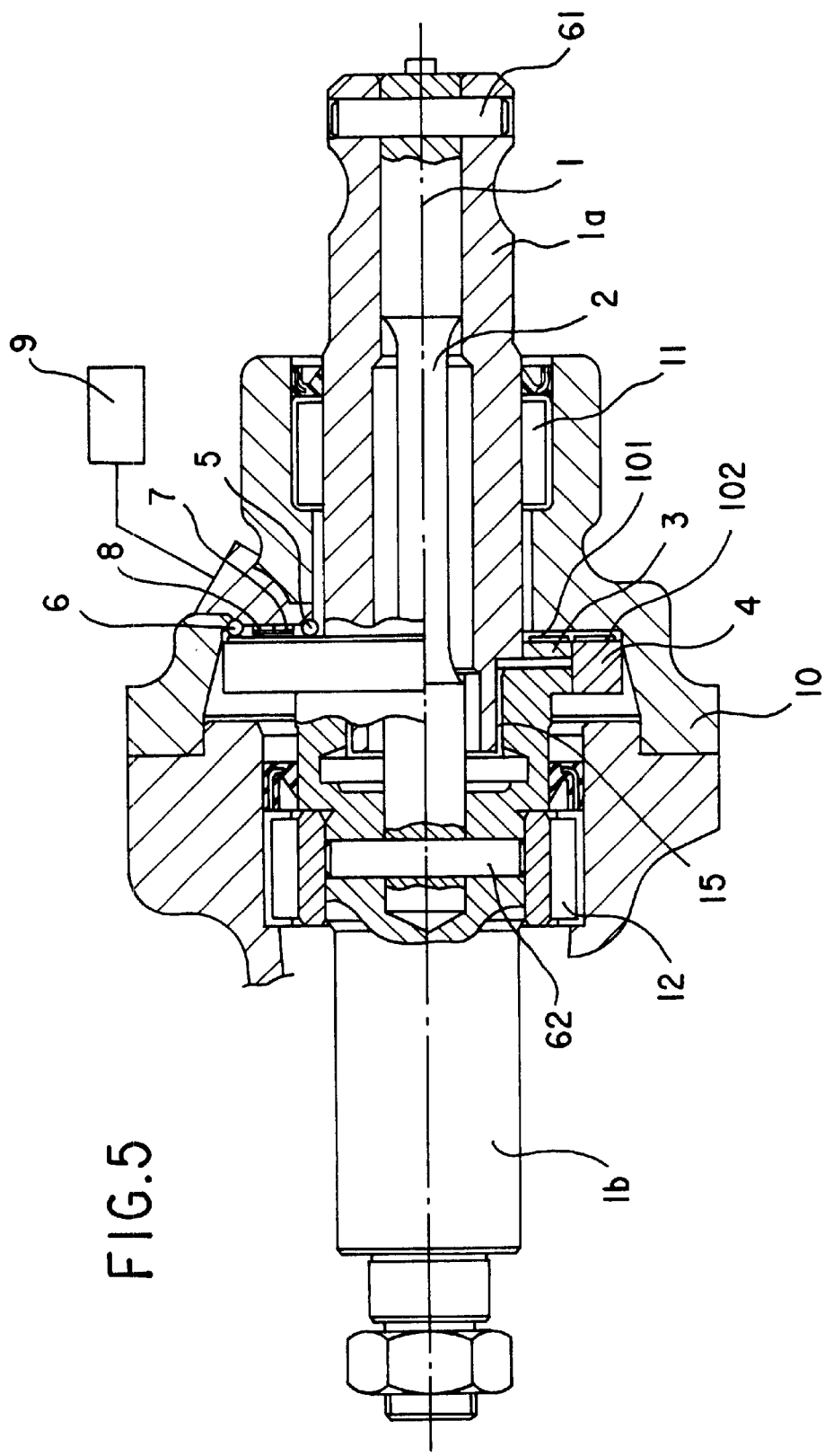
FIG. 5 is a cross sectional view of a torque transducer according to a second embodiment of the present invention, showing the shaft assembly comprising two torque input members connected by a torsion bar, two grating elements with grating zones and associated arrays and EMR sources, where the first and second boundaries of the grating elements are disposed substantially radially with respect to the axis of rotation of the shaft.
Figure 6:
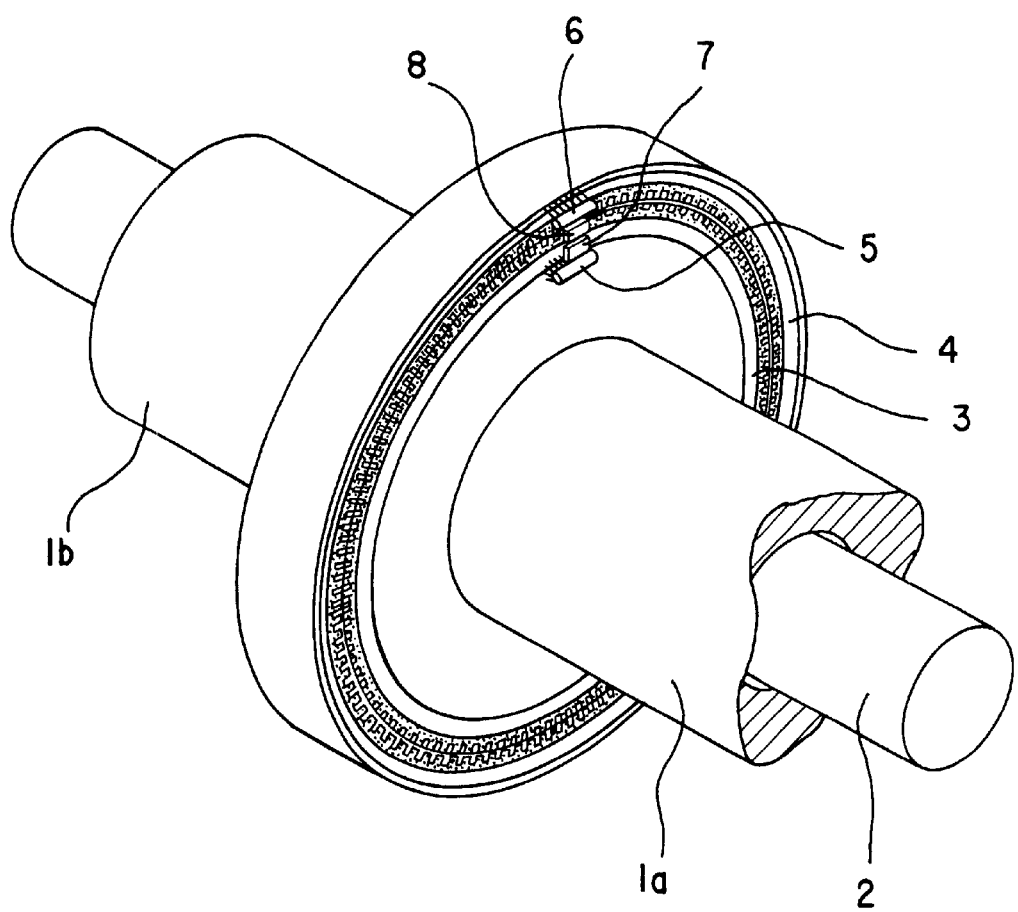
FIG. 6 is a detailed diagrammatic view of two torque input members connected by a torsion bar shown in FIG. 5, showing the EMR sources, grating zones and the associated arrays.
Figure 7:
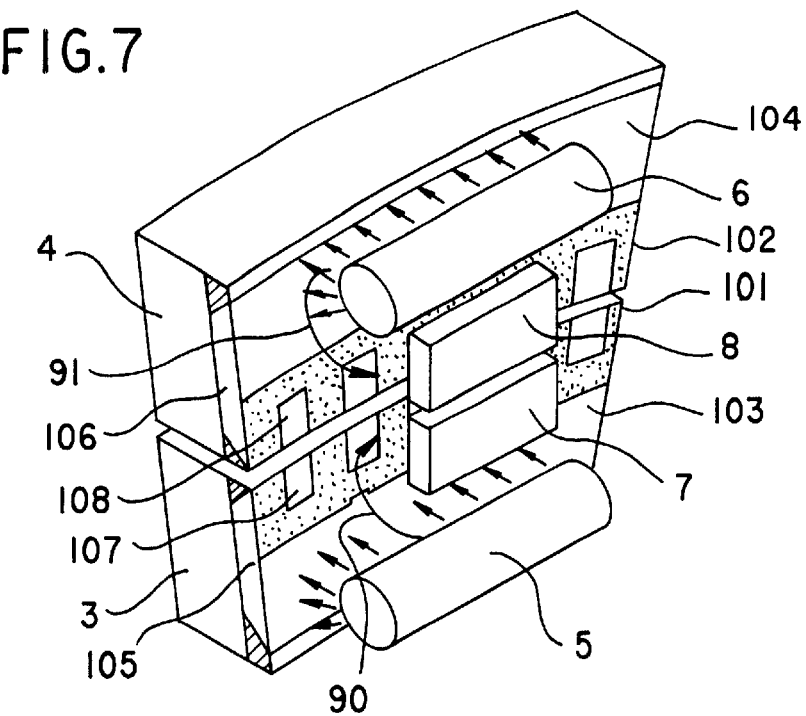
FIG. 7 is a partial view of FIG. 6 showing one grating element and the relationship of the boundaries, grating zone, EMR source and the associated array.

FIGS. 5, 6 and 7 are views of a torque transducer according to a second embodiment of the present invention. FIG. 5 and FIG. 6 are respectively a cross section and a perspective view of the transducer. FIG. 7 is an expanded view of a portion of one grating element illustrating the grating element construction.

Planar, ring shaped grating elements 3 and 4 are attached to torque input members 1a and 1b of the shaft and connected at either end by a torsionally compliant coupling in the form of torsion bar 2. Grating elements 3 and 4 are disposed radially with a central axis collinear with axis of rotation 1 of the shaft and comprise grating zones 101 and 102 respectively. Torque input members 1a and 1b and torsion bar 2 are connected via cross pins 61 and 62. The assembly is enclosed in housing 10 and supported by bearings 11 and 12. Transmission paths 90 and 91 for Electro-magnetic Radiation (EMR) commence at each EMR source 5 and 6, and pass in turn through respective first boundaries 103 and 104, respective mediums 105 and 106, respective second boundaries 107 and 108, respective grating zones 101 and 102 which interface with respective second boundaries 107 and 108 and terminated at respective arrays 7 and 8. EMR passing through the medium is able to change direction due to internal reflection in the manner employed by "light guides" which are commonly used to guide EMR along a specific path, for example in illuminated instrument panels in automobiles. In other (not shown) embodiments either or both of grating zones 101 and 102 of respective grating elements 3 and 4 may alternatively interface with the respective first boundaries 103 and 104, hence the order of first boundaries 103 and 104, second boundaries 107 and 108 and grating zones 101 and 102 in transmission paths 90 and 91 may differ from that described in FIGS. 5–7. However, in all embodiments, only one grating zone of one grating element resides in each respective transmission path communicating EMR from the respective source to the respective array. EMR sources 5 and 6 are disposed to provide EMR in a direction substantially parallel to axis of rotation 1 of the shaft, and illuminate respective transmission paths 90 and 91. Arrays 7 and 8 of EMR sensitive detectors are disposed to receive EMR from transmission paths 90 and 91 in a direction substantially parallel to axis of rotation 1 of the shaft and the patterns thus generated on arrays 7 and 8 are processed by processor 9. When torque is applied between torque input members 1a and 1b, torsion bar 2 angularly deflects, resulting in a displacement of one pattern with respect to the other. Failsafe mechanism 15 limits the maximum torque carried by torsion bar 2 by providing a limit to the amount of angular deflection of torque input member 1a with respect to torque input member 1b. Such a failsafe mechanism is well known in the art of power steering and is not described here. Again, the methods by which the images are processed are well known in the art of image analysis, and some of these methods used are described in "VISION CHIPS: Implementing Vision Algorithms with Analog VLSI Circuits", by Christof Koch and Hua Li, IEEE Computer Society Press, ISBN 0-8186-64924. Suitable arrays include linear photodetector arrays such as device TSL1410 manufactured by Texas Instruments Inc.

Figure 8:
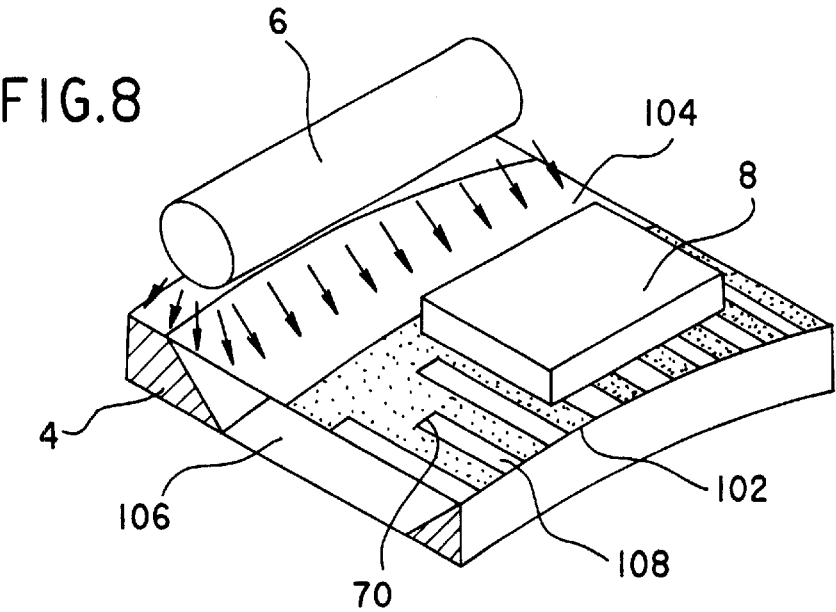
FIG. 8 is a view similar to FIG. 3, showing a "home mark" for the determination of shaft angular position.

FIG. 8 shows an alternative version of the first embodiment of the present invention (refer back to FIGS. 1, 2 and 3), however it should be noted that this same concept could be readily applied to any of the embodiments disclosed in this specification. A grating element 4 comprises a grating zone 102 composed of alternating regions of high and low transmissivity, similar to those as shown in FIGS. 2 and 3. In addition to these regions, at least one additional "home mark" region 70 of high or low transmissivity is added to the zone at a predetermined angular position in such a manner as to reside in the transmission path. Array 8 receives EMR from the transmission path and the pattern thus generated on the array is processed by the processor 9 to provide a measurement of torque, and intervening marks can be counted from this home mark position by the processor to provide a measurement of absolute angular position of the relevant torque input member.

Figure 9A:
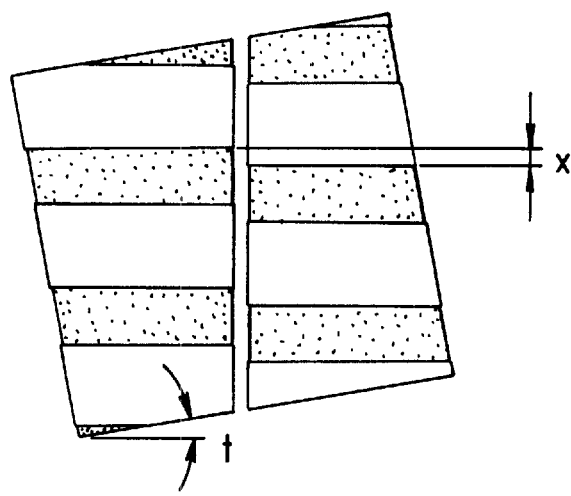
FIG. 9a shows typical patterns produced on the first and second arrays according the first embodiment of the present invention, where these arrays are two dimensional arrays.

FIGS. 9a ,b, 10a,b, 11a–e and 12 show typical patterns produced by incident EMR on the arrays according to various embodiments of the present invention. Note that, for illustration in all these figures, the black-rendered portions correspond to portions of the patterns with low (or essentially no) illumination while the non-rendered (ie. white) portions correspond to highly illuminated portions of the patterns.

Figure 9B:
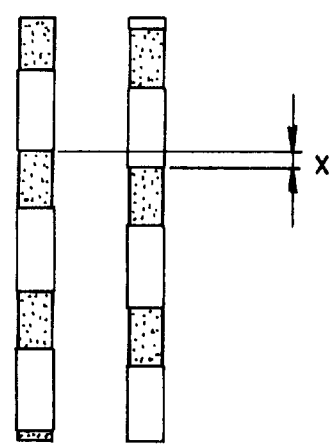
FIG. 9b shows typical patterns produced on the first and second arrays according the first embodiment of the present invention, where these arrays are one dimensional arrays.

FIGS. 9a and 9b show typical patterns produced by incident EMR on the arrays according to the first embodiment of the present invention (shown in FIGS. 1, 2 and 3). In FIG. 9a the array is a two dimensional array, and, for example incorporates a Texas Instruments TC277 Black & White CCD Image Sensor with 699×288 pixels and an active window size of approximately 8 mm×6 mm. The methods by which the patterns are processed are generally well known in the art of image analysis, and some of these methods used are described in "Vision Chips: Implementing Vision Algorithms with Analog VLSI Circuits", by Christof Koch and Hua Li, IEEE Computer Society Press, ISBN 0-8186-6492-4. In order to improve edge delineation, it is seen in FIG. 9a that the array is mounted at a small angle 't' (typically less than 15 deg.) with respect to the pattern. This misalignment produces more information relating to the edge position since the pattern no longer "beats" with the pixel alignment of the array and regression techniques are therefore more accurate due to an increased amount of data. Dimension 'x', being the average relative displacement between edge positions in the patterns on the array, relates directly to the relative angular displacement of the two grating zones and hence to shaft torque. In FIG. 9b the arrays are one dimensional arrays, and for example each incorporate a Texas Instruments TSL1410 Black & White Linear Array chip with 128 pixels and an active window length of approximately 8 mm. Dimension 'x' is measured similarly however, without the benefits of improved edge delineation provided by the above-mentioned two-dimensional array.

Figure 10B:
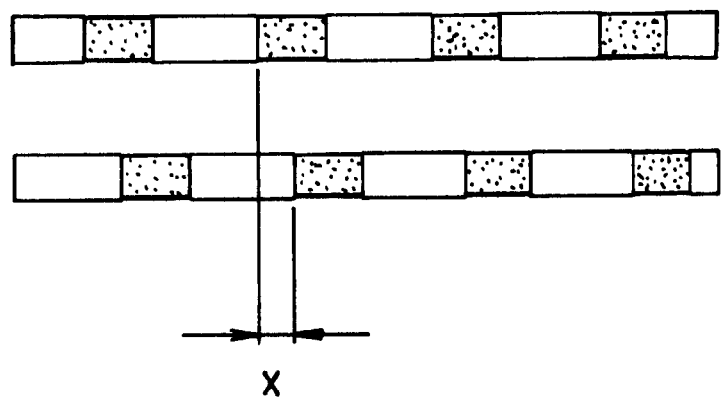
FIG. 10b shows typical patterns produced on the first and second arrays according the second embodiment of the present invention, where these arrays are one dimensional arrays.
Figure 10A:
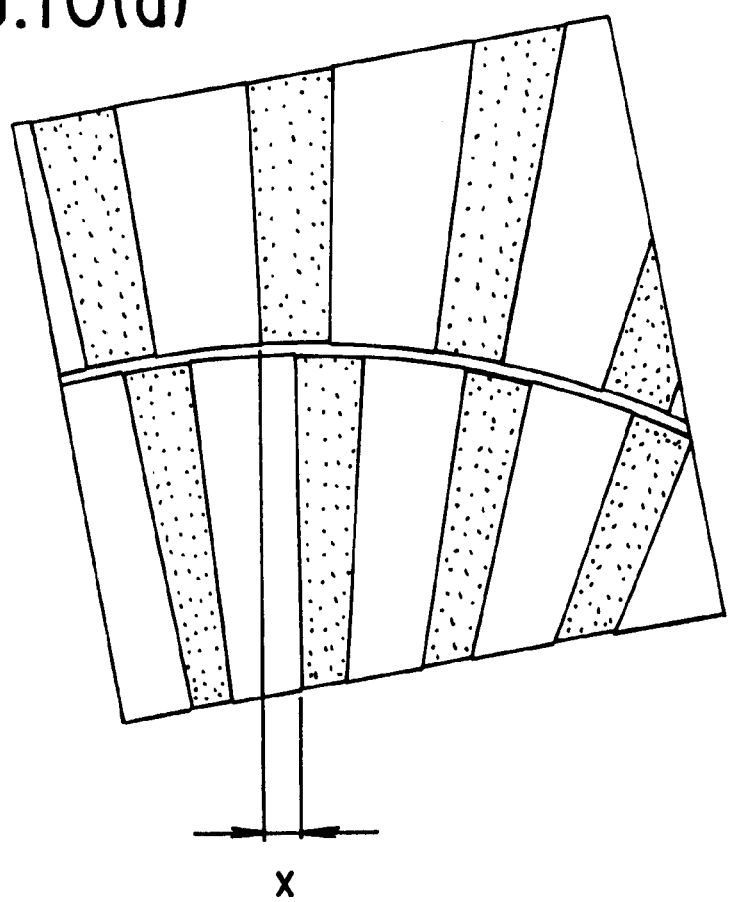
FIG. 10a shows typical patterns produced on the first and second arrays according to the second embodiment of the present invention, where these arrays are two dimensional arrays.

FIG. 10a shows a typical pattern produced by incident EMR on a single array according to the second embodiment of the present invention (shown in FIGS. 5–7). The array is a two-dimensional array as described above. Dimension 'x', being the relative displacement between the two edge positions in the pattern, again relates directly to the relative angular displacement of the two grating zones and hence to shaft torque. FIG. 10b shows the patterns in the case of two one-dimensional arrays as described above, Dimension 'x' can be measured similarly and the appropriate recognition and processing aspects are well described in International Patent Application PCT/GB95/02017.

For both embodiments described above the pattern migrates across the limited width one-dimensional or two-dimensional array(s) as the shaft rotates, quite independent of shaft torque. Again, using techniques well known in the discipline of pattern recognition, the rate of pattern migration and the total displacement of the pattern can be calculated providing a measure of the angular velocity and relative angular position of the torque input members. A "home mark" on one of the grating zones, as described in reference to FIG. 8, can be used as an absolute angular position reference. The intervening marks can be counted from this home mark position by the processor to provide a measurement of absolute angular position of the relevant torque input member.

FIGS. 11a–e show details of the regions of high and low transmissivity of grating zones 101 and 102, of respective grating elements 3 and 4, according to another alternative for the first embodiment of the present invention (refer back to FIGS. 1–3). Grating zones 101 and 102 are arranged in the form of a succession of 120 binary bar codes 60a–g and 61a–g. These 120 bar codes are disposed at a uniform 3 degree angular spacing around the circumference of each cylindrical grating element. The viewing window of two-dimensional array 20 is also shown superimposed as dotted lines in these diagrams.

FIG. 12 shows details of bar code 60a on grating zone 101, in order to better describe the bar code format. Each bar code comprises 9 bars in total: one "start" bar 62a, seven "angle position" bars 62b–h, and one "stop" bar 62i. In this embodiment start bar 62a and stop bar 62i are always regions of low transmissivity whereas interposed angle position bars are either regions of high or low transmissivity depending on the binary value of the angle position value to be encrypted. For example bar code 60a comprises regions of low transmissivity in the form of bars 62c, 62d, and 62f and regions of high transmissivity in the form of bars 62b, 62e, 62g and 62h. Bar code 60a therefore has a binary value of 0110100 or an angle position value of 52 (base 10). The use of seven angle position bars theoretically enables the encryption of up to 128 discrete angle position values which is necessary to encompass and individually identify each of the 120 bar codes on each grating zone.

Figure 11A:
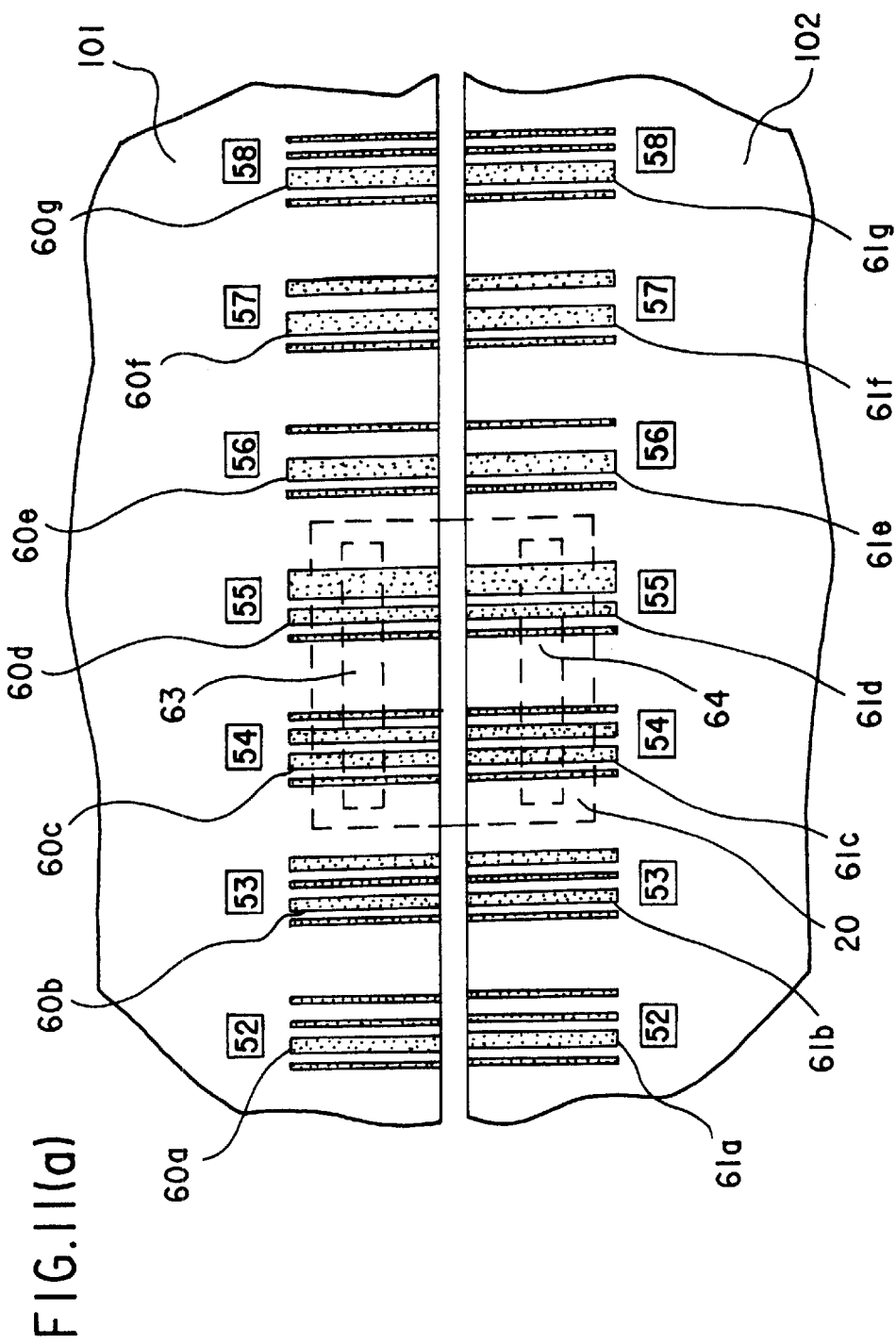
FIGS. 11a–e show successive relative positions of the grating zones for an alternative version of the first embodiment of the present invention, wherein the grating zones are alternatively in the form of a succession of bar code sub-patterns allowing the measurement of absolute angular position of the torque input members.
Figure 11B:
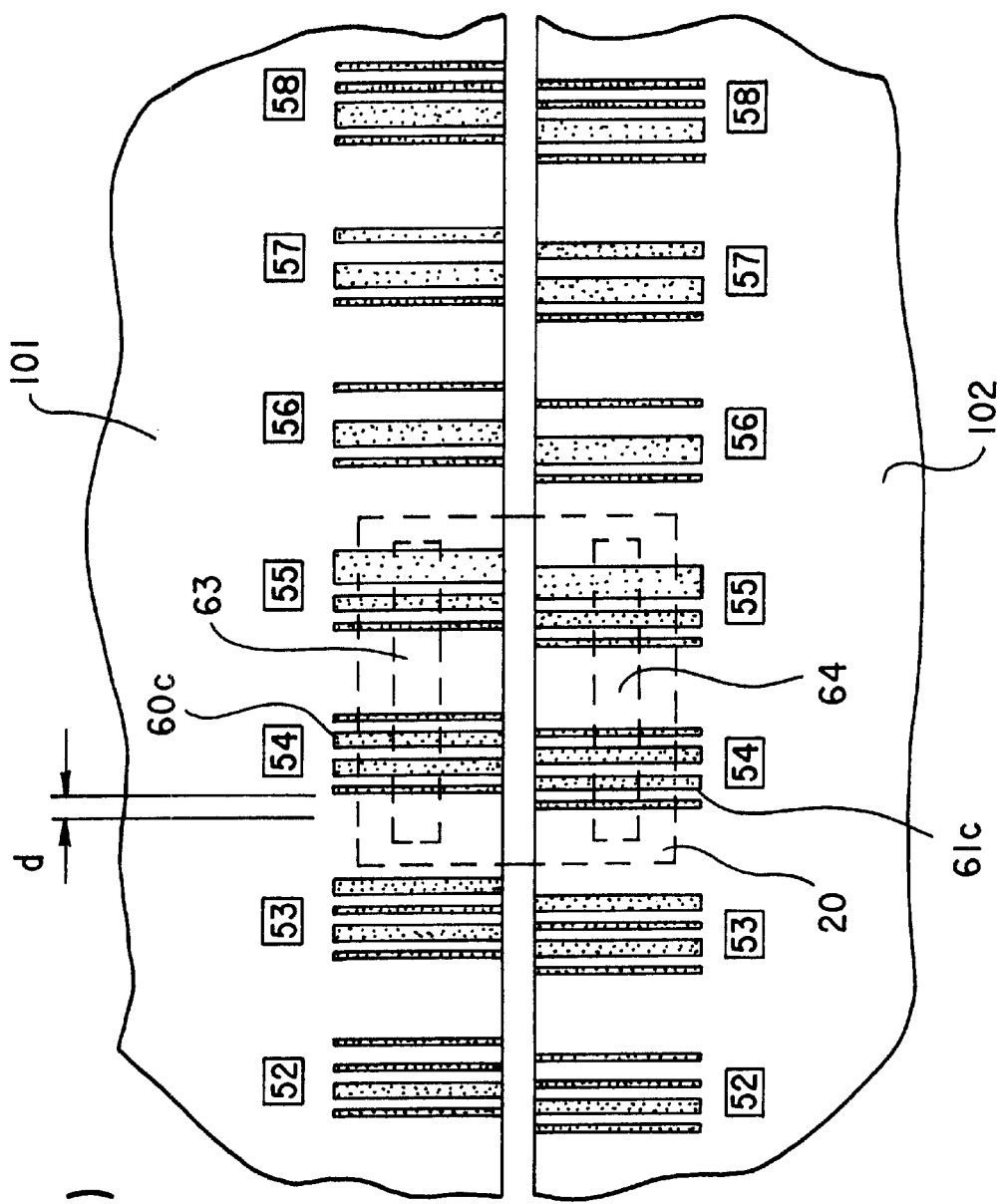
Figure 11C:
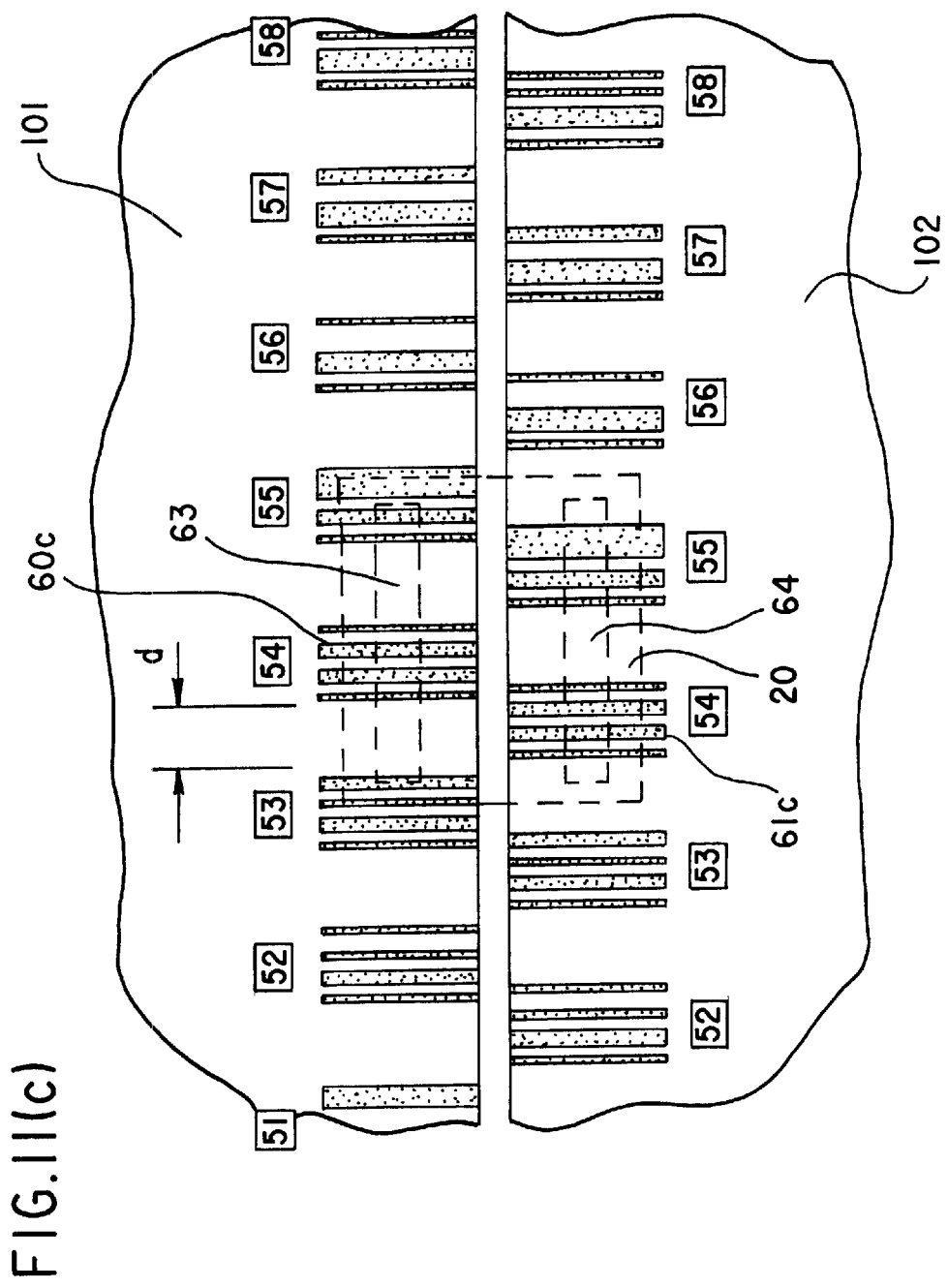
Figure 11D:
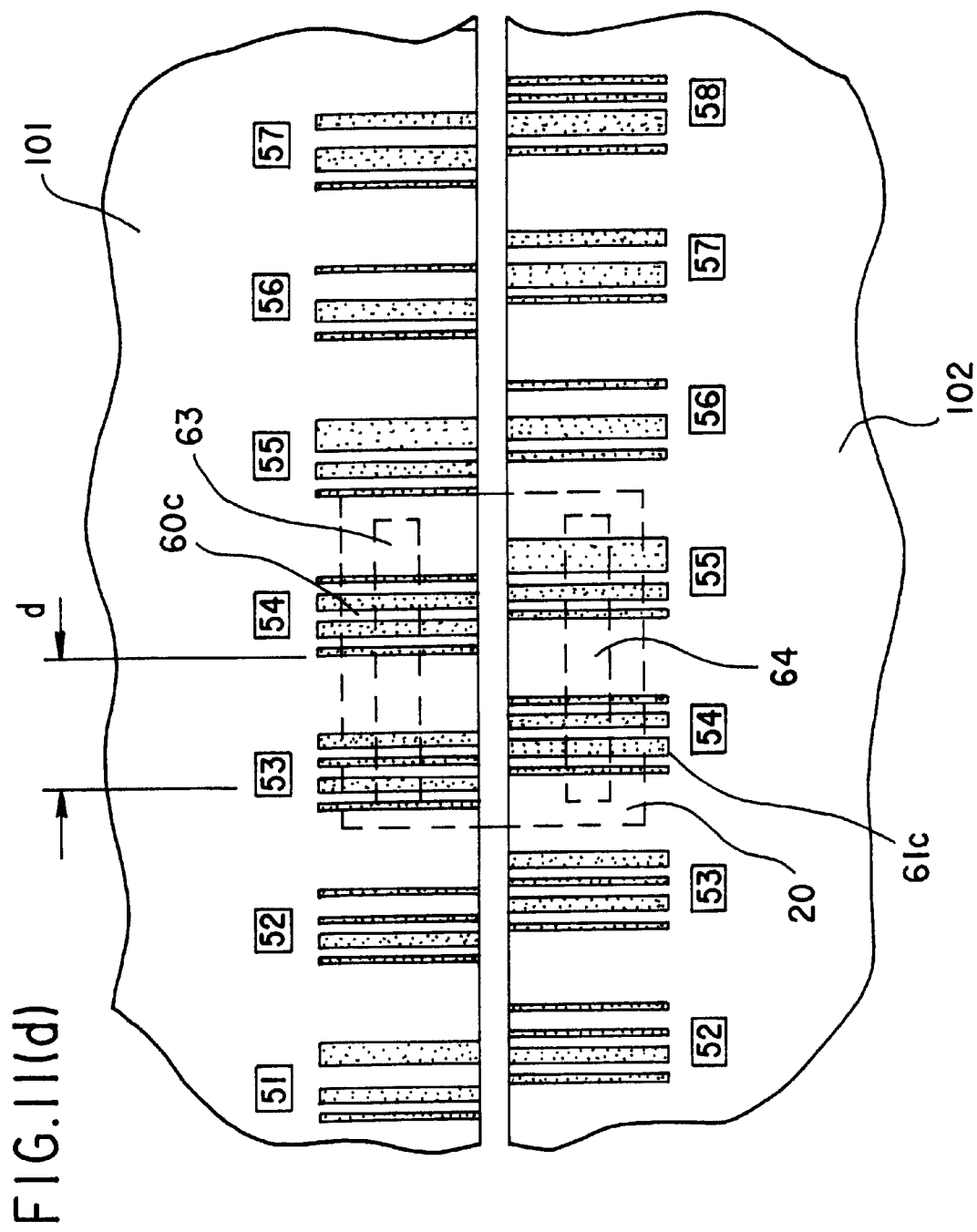
Figure 11E:
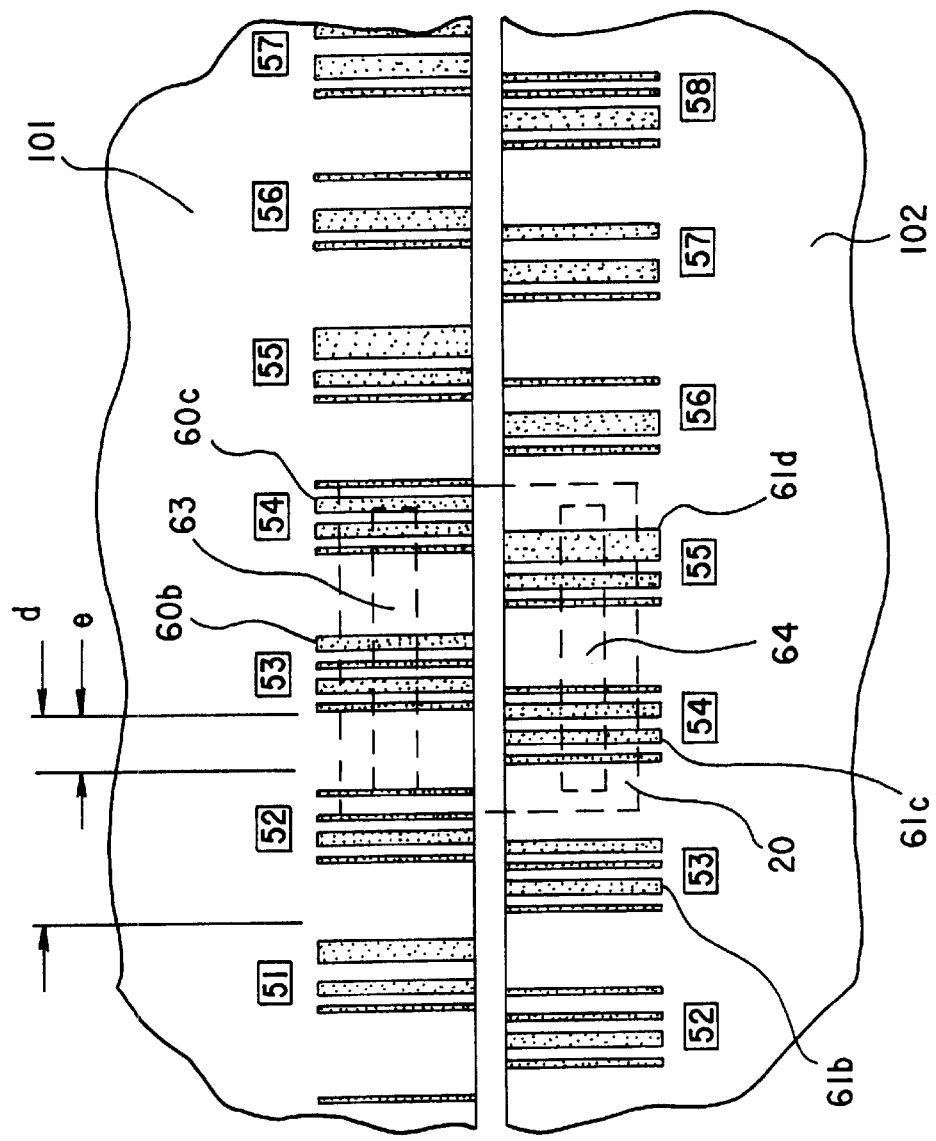

FIG. 11a shows the position of grating zones 101 and 102 when zero torque is applied to torque input members 1a and 1b (refer back to FIG. 1). It is seen that bar codes 60a and 61a, both corresponding to angle position value of 52 on grating zones 101 and 102 respectively, are mutually aligned for this zero torque condition. The same is true for all other 119 bar code pairs 60b and 61b, 60c and 61c, etc, The method of manufacturing of such bar coded grating zones, and accurately mutually aligning them at the zero torque condition, is described in International Patent Application No. PCT/AU98/00857 entitled "Method for Manufacture of Optical Torque Transducers".

FIGS. 11b–e show successive relative angular displacements of grating zones 101 and 102 as an increasing anticlockwise torque is applied to torque input member 1b with respect to torque input member 1a. The viewing window of two-dimensional array 20 is shown superimposed as dotted lines. Note that this viewing window is chosen to be sufficiently large to always capture at least one complete bar code from each of the two grating zones, irrespective of the relative angular displacement of the two grating zones (as a function of input torque) and the absolute rotation angle of the grating zones over their 360 degree possible range (as a function of steering angle). In order to reduce total silicon usage (and hence cost), two separate one-dimensional (ie. linear) arrays or smaller elongated two-dimensional arrays 63 and 64 could be used instead of the larger two-dimensional array 20. In certain VLSI vision chip configurations, array 20 or arrays 63 and 64 may be embedded in, attached to, or integrated as part of, the microprocessor chip used to carry out the necessary processing, that is processor 9.

Array 20 (or arrays 63 and 64) receives incident EMR from the regions of high transmissivity of grating zones 101 and 102 which are instantaneously in the array's (or arrays') viewing window. In the example shown in FIGS. 11b–d, array 20 (or arrays 63 and 64) receive incident EMR from bar codes 60c and 61c and processor 9 is therefore able to derive relative displacement distance 'd' of grating zones 101 and 102 on the respective peripheries of grating elements 3 and 4 and hence a measure of input torque.

Most importantly however, in this embodiment processor 9 is now also programmed to decode the angle position values of all complete binary bar codes which are in the viewing window at any one time, in this case bar codes 60c and 61c both corresponding to angle position values 54. The use of such bar codes has two significant advantages.

Firstly, for still larger relative displacements of grating zone 101 with respect to grating zone 102, the problem of aliasing is avoided. This is demonstrated in FIG. 11e where bar code 60b (angle position value 53) on grating zone 101 has displaced a sufficient distance to the right that it now actually lies between bar codes 61c and 61d (angle position values 54 and 55 respectively) on grating zone 102. However by recognising that the angle position value of bar code 60b is 53, and that therefore its relative position at the zero torque condition is adjacent to bar code 61b on grating zone 102, the correct relative displacement of the grating zones 'd' can be calculated as:

$$d = e + (54-53)*3*r*pi/180 = e + 3*r*pi/180 \text{ (mm)}$$

where r is the radius of the grating element. Without the use of bar codes, aliasing would have occurred for a much smaller relative displacement of the two grating zones, namely when bar code 60b became adjacent to bar code 61c. By arranging the regions of high and low transmissivity in the form of successive binary bar codes, relative angular displacements of grating elements 3 and 4 can be correctly measured for substantial deviations from the zero torque condition, and independent of the actual spacing of the regions of high and low transmissivity.

Secondly, use of bar codes enables measurement of the absolute angular position of either of the two torque input members 1a and 1b through a range of 360 deg, that is +/−180 deg from some known absolute position. This is achieved without the need for any counting process to be carried out in processor 9 (as in the case of the previous alternative version of the present invention shown in FIG. 8).

If the maximum relative angular displacement of the grating elements is externally limited in some manner, for example via the use of a failsafe mechanism as earlier described, aliasing may not be a problem and in this case successive bar codes may be employed on only one of the two grating zones. This will still provide sufficient information to provide a measure of absolute angular position over the above mentioned +/−180 deg range.

It should be noted that the use of bar codes can be similarly applied to radially disposed transducer arrangements, for example those described in reference to the second embodiment (FIGS. 5, 6 and 7) of the present invention.

Also in the present specification "high transmissibility" and "low transmissibility" is broadly defined in reference to the particular EMR source and array selected. For example, if an array sensitive to red light and a white light source was used, the regions of high and low transmissivity of the grating zone may consist of regions which are painted (or otherwise coloured by some means) with a red and blue transmissive coating respectively.

Figure 13:
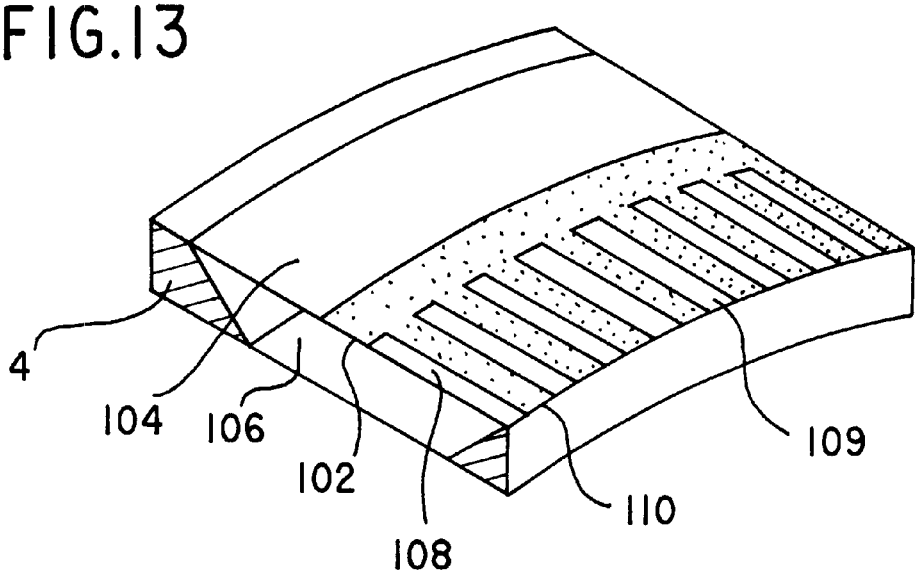
FIG. 13 shows a section of one of the grating elements similar to FIG. 3 wherein the grating zones are generated by photolithography or deposition of metal on the second boundaries of the grating elements.

FIG. 13 shows a portion of grating element 4, showing a method of generating grating zone 102 consisting of regions of high and low transmissibility. Regions 110 of low transmissibility are applied to second boundary 108 of medium 106 of grating element 4 using photolithographic techniques. Remaining regions 109, which have not been treated, retain high transmissibility. An example of a suitable photolithographic process is 5700 Series Photoresists, manufactured by Eternal Chemical Co Limited of Kaohsiung, Taiwan. Alternatively, regions 110 are applied using a metallic coating process, such as aluminium plating or vapour deposition.

Figure 14:
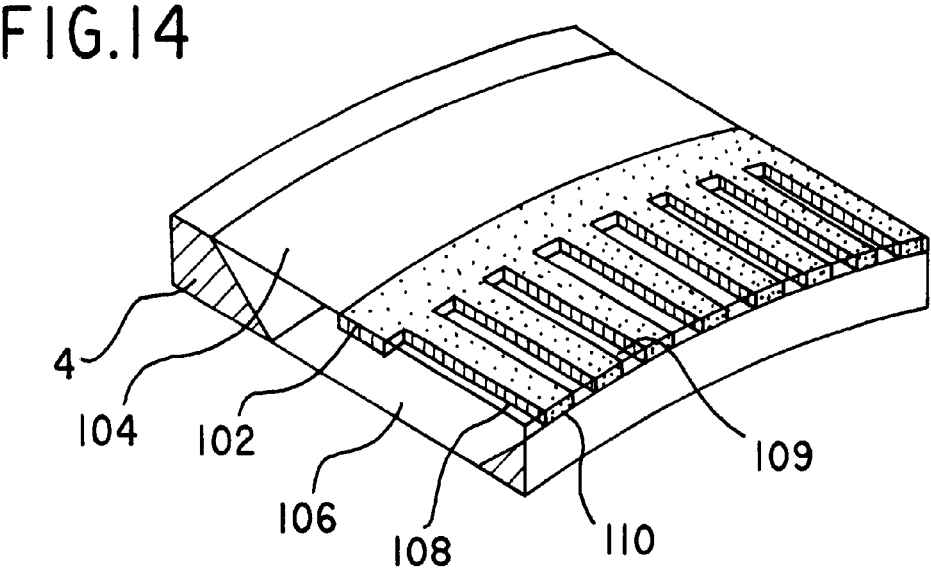
FIG. 14 shows a section of one of the grating elements similar to FIG. 3 wherein the grating zones are generated by physical or chemical modification of the second boundary or medium.

FIG. 14 shows a portion of grating element 4 showing an alternative method of generating grating zone 102 consisting of regions of high and low transmissibility. Regions 110 adjacent to an original second boundary of medium 106, have been modified by physical or chemical means to change the transmissibility of regions 110. A new second boundary 108 of medium 106 is created immediately beneath regions of low transmissibility 110, thereby forming grating zone 102 that interfaces with this second boundary 108. Remaining regions 109 have not been modified and retain high transmissibility. An example of a suitable process of modification is abrasion of polymer film to produce regions of higher transmissibility as used in backlighting applications. An example of this technique is described in European Patent Application No. 0547 343 (Metzei).

Figure 15:
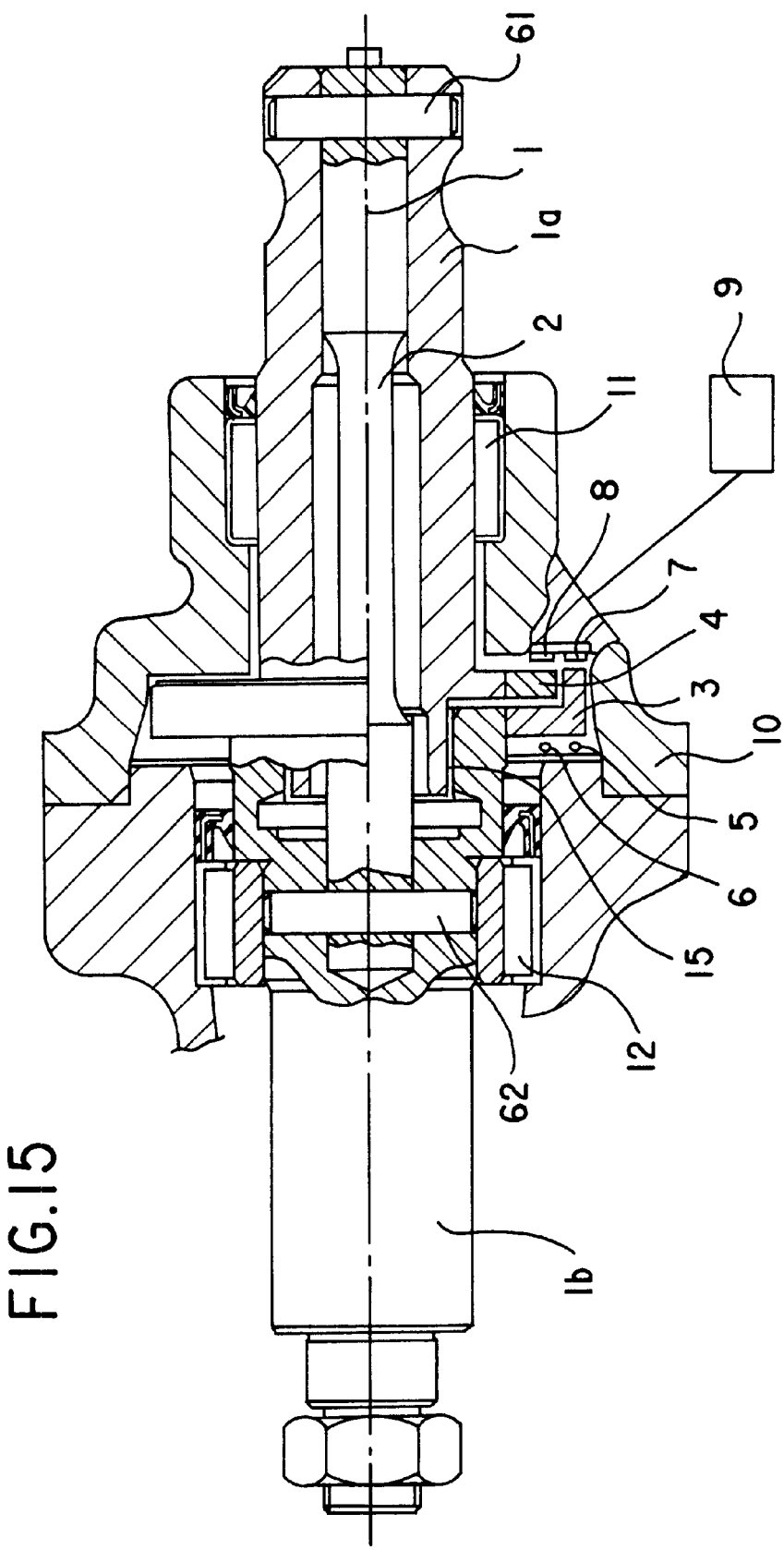
FIG. 15 is a cross sectional view of a torque transducer according to a third embodiment of the present invention, showing the shaft assembly comprising two torque input members connected by a torsion bar, two grating elements with grating zones and associated arrays and EMR sources, where the first and second boundaries of the grating elements are disposed substantially radially with respect to the axis of rotation of the shaft.
Figure 16:
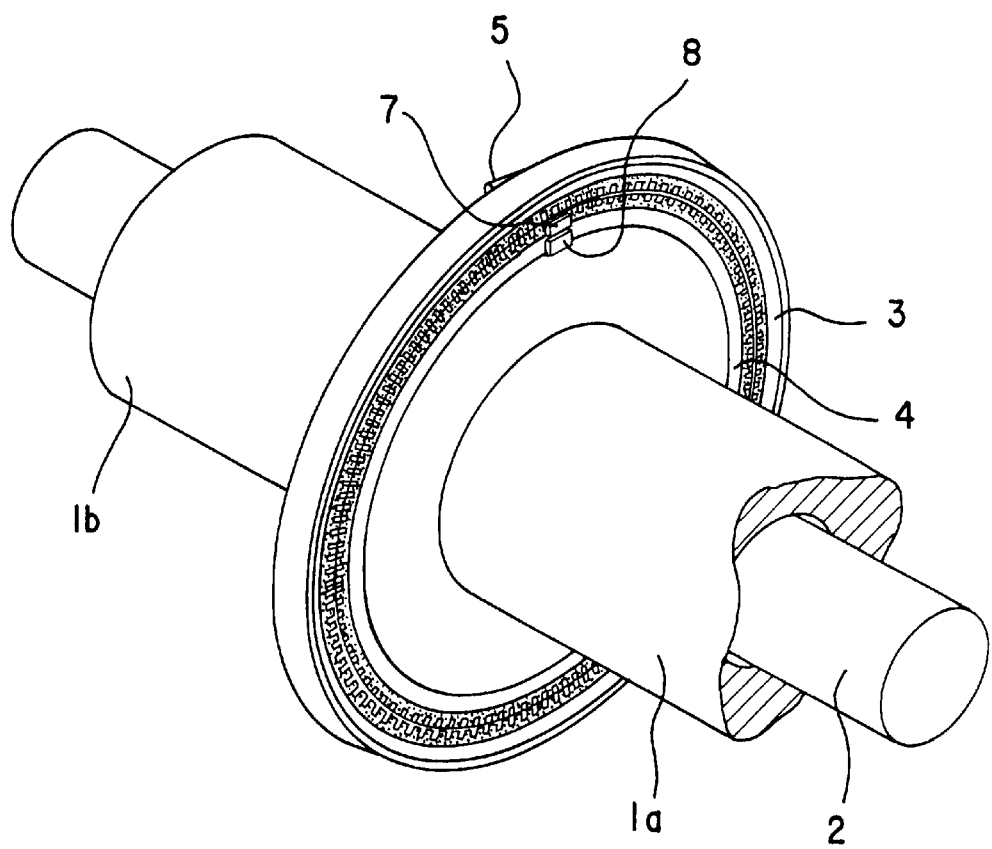
FIG. 16 is a detailed diagrammatic view of two torque input members connected by a torsion bar as shown in FIG. 15, showing the EMR sources, grating zones and the associated arrays.
Figure 17:
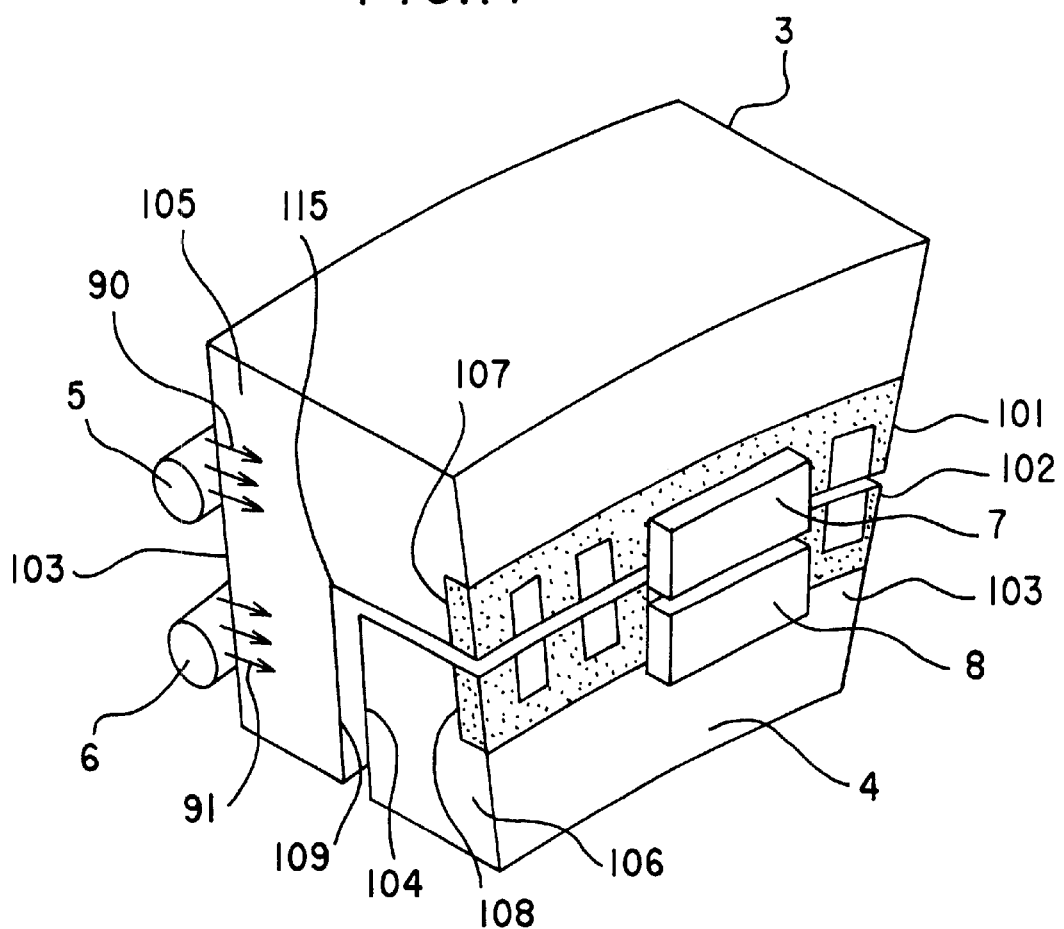
FIG. 17 is a partial view of FIG. 16 showing the grating elements, the boundaries, grating zones, EMR sources and the associated arrays.

FIGS. 15, 16 and 17 are views of a torque transducer according to a third embodiment of the present invention. FIG. 15 and FIG. 16 are respectively a cross section and a perspective view of the transducer. FIG. 17 is an expanded view of a portion of one grating element illustrating the grating element construction.

The third embodiment of the torque transducer has ring shaped grating elements 3 and 4 attached to torque input members 1b and 1a of the shaft and connected at either end by a torsionally compliant coupling in the form of torsion bar 2. Grating element 3 has an L-shaped cross section and grating element 4 has a rectangular cross section, as shown in FIGS. 15 and 17. Grating elements 3 and 4 are disposed axisymetrically with a central axis collinear with axis of rotation 1 of the shaft, with grating element 4 nested adjacent to internal corner 115 of grating element 3. Grating elements 3 and 4 comprise grating zones 101 and 102 respectively. Torque input members 1a and 1b and torsion bar 2 are connected via cross pins 61 and 62. The assembly is enclosed in housing 10 and supported by bearings 11 and 12. EMR sources 5 and 6 are disposed on the opposite side of grating elements 3 and 4 with respect to arrays 7 and 8. Transmission paths 90 and 91 for EMR commence at respective EMR sources 5 and 6, and both pass through first boundary 103 of grating element 3. Transmission path 90 passes through transparent medium 105, second boundary 107 which interfaces with grating zone 101 and terminates at array 7. Transmission path 91 passes through transparent medium 105, and third boundary 109 of grating element 3, and then passes through first boundary 104 of element 4, transparent medium 106, second boundary 108 which interfaces with grating zone 102 and terminates at array 8. Respective first boundaries 103 and 104, second boundaries 107 and 108 and third boundary 109 are all planar and disposed substantially radially with respect to the axis of rotation of the shaft. EMR sources 5 and 6 are disposed to emit EMR in an axial direction substantially parallel to axis of rotation 1 of the shaft, and illuminate respective transmission paths 90 and 91. Arrays 7 and 8 of EMR sensitive detectors are disposed to receive EMR from transmission paths 90 and 91 in an axial direction substantially parallel to axis of rotation 1 of the shaft and the patterns thus generated on arrays 7 and 8 are processed by processor 9. When torque is applied between torque input members 1a and 1b, torsion bar 2 angularly deflects, resulting in a displacement of one pattern with respect to the other. Failsafe mechanism 15, similar to that of the transducer of the second embodiment, limits the maximum torque carried by torsion bar 2 by providing a limit to the amount of angular deflection of torque input member 1a with respect to torque input member 1b. Again, as stated earlier in relation to the second embodiment the methods by which the images are processed are well known in the art of image analysis.

Whilst two separate EMR sources 5 and 6 are shown, they can be replaced by a single EMR source capable of illuminating the two separate transmission paths 90 and 91.

Arrays 7 and 8 may be one or two dimensional arrays, and, for ease of description have been shown as two distinct units. Suitable one and two dimensional arrays include the TSL1410 linear photodetector array and the TC277 Black and White CCD Image Sensor respectively, both manufactured by Texas Instruments Inc. However, in certain applications, the arrays 7 and 8 may be combined as a single larger two-dimensional array (not shown) or embedded in, attached to, or integrated as part of a microprocessor used to carry out the processing in processor 9.

It will be appreciated by those skilled in the art that numerous variations and modifications may be made to the invention without departing from the spirit and scope of the invention.

What is claimed is:

1. A torque transducer comprising a rotating shaft at least partially surrounded by a fixed housing, an axis of rotation of the shaft fixed with respect to the housing, the shaft comprising first and second torque input members connected by a torsionally compliant coupling, the coupling enabling angular deflection of the first torque input member relative to the second torque input member as a function of a magnitude of the torque in the shaft, the transducer comprising at least one electro-magnetic radiation (EMR) source and at least one array of EMR sensitive detectors, a first grating element attached to the first toque input member and a second grating element attached to the second torque input member, the first and second grating elements each comprising a grating zone, each grating zone comprising alternating regions of high and low transmissibility to the EMR, wherein only one grating zone of one grating element resides in a transmission path communicating EMR from any source to any array, a pattern is produced by incident EMR on each of the at least one array resulting from the alternating regions of high and low transmissibility of the grating zone residing in the at least one transmission path to that array, a pattern on the at least one array is processed by a processor to derive a relative angular deflection of the first and second torque input members and hence provide a measure of the magnitude of the torque in the shaft.

2. A torque transducer as claimed in claim 1, wherein at least one of the grating elements further comprises a medium transparent to the EMR, the transmission path communicating EMR from any source to any array comprises a path commencing at the respective source, passing through a first boundary of the medium, optically communicating through the medium, then exiting through a second boundary of the medium and terminating at the respective array, the grating zone of either one of the first and second grating elements interfacing with either of the first or second boundaries.

3. A torque transducer as claimed in claim 1, wherein the transducer comprises two transmission paths, each path commencing at a separate source, passing through a respective grating zone, and terminating at a separate array.

4. A torque transducer as claimed in claim 1, wherein the transducer comprises two sets of transmission paths, each set of transmission paths comprising at least two transmission paths commencing at no less than two separate sources, each set of transmission paths passing through a respective grating zone, and terminating at a separate array.

5. A torque transducer as claimed in claim 1, wherein the transducer comprises two transmission paths, each of said two transmission paths commencing at a common source, passing through the grating zone of the first and second grating elements, respectively, and terminating at a separate array of the at least one array of EMR sensitive detectors.

6. A torque transducer as claimed in claim 1, wherein the transducer comprises two transmission paths, each of said two transmission paths commencing at a separate source, passing through the grating zone, and terminating at a common array.

7. A torque transducer as claimed in claim 1, wherein the transducer comprises two transmission paths, each of said two transmission paths commencing at a common source, passing through the grating zone of the first and second grating elements, respectively, and terminating at a common array of the at least one array of EMR sensitive detectors.

8. A torque transducer as claimed in claim 1, wherein the transducer comprises two sets of transmission paths, each set comprising at least two transmission paths commencing at no less than two separate sources, each set of transmission paths passing through the grating zone of the first and second grating elements, respectively, and terminating at a common array of the at least one array of EMR sensitive detectors.

9. A torque transducer as claimed in claim 2, wherein the first boundary is disposed radially with respect to the axis of rotation of the shaft, and the EMR emitted by the respective source is emitted in a substantially axial direction, parallel to the axis of rotation of the shaft.

10. A torque transducer as claimed in claim 2, wherein the first boundary is substantially cylindrical with a central axis collinear with the axis of rotation of the shaft, and the EMR emitted by the respective source is emitted in a radial direction, perpendicular to the axis of rotation of the shaft.

11. A torque transducer as claimed in claim 2, wherein the second boundary is cylindrical with a central axis collinear with the axis of rotation of the shaft, and the respective array is positioned adjacent to the second boundary.

12. A torque transducer as claimed in claim 2, wherein the second boundary is disposed radially with the respect to the axis of rotation of the shaft, and the respective array is positioned adjacent to the second boundary.

13. A torque transducer as claimed in claim 1, wherein the pattern is processed by the processor to derive the angular velocity of the at least one of the torque input members.

14. A torque transducer as claimed in claim 1, wherein the pattern is processed by the processor to derive the relative angular position of the at least one of the torque input members.

15. A torque transducer as claimed in claim 1, wherein the grating zone of either one of the first and second grating elements includes the regions of high or low transmissibility whose resulting pattern is also processed to derive the absolute angular position of the torque input member to which the respective grating element is attached.

16. A torque transducer as claimed in claim 1, wherein the grating zone of either one of the first and second grating elements is arranged in a form of a succession of bar codes.

17. A torque transducer as claimed in claim 16, wherein the resulting pattern on the respective array is processed to derive the absolute angular position of the at least one of the torque input members.

18. A torque transducer as claimed in claim 16, wherein the resulting pattern on the respective array is processed to derive the absolute angular position of both of the torque input members and the difference in absolute angular position of the first and second torque input members is processed to provide a measure of the magnitude of the torque in the shaft.

19. A torque transducer as claimed in claim 1, wherein the array comprises a one dimensional or a two dimensional array, a CCD, a VLSI vision chip or a lateral effect photodiode.

20. A torque transducer as claimed in claim 2, wherein the transparent medium comprises a polymer or glass.

21. A torque transducer as claimed in claim 2, wherein the grating zones comprise a metallic coating on the first or second boundaries.

22. A torque transducer as claimed in claim 2, wherein the grating zones comprise a coating deposited by a photolithographic process on the first or second boundaries.

23. A torque transducer as claimed in claim 2, wherein the grating zones comprise physical or chemical modification of the medium.

24. A torque transducer as claimed in claim 2, wherein the transducer comprises two transmission paths, both of the first and second grating elements comprising the medium substantially transparent to the EMR and the at least one of the transmission paths passing through the mediums of both of the first and second grating elements, but only passing through one grating zone.

25. A torque transducer as claimed in claim 24, wherein one of the two transmission paths passes through at least four boundaries, wherein two of the at least four boundaries are associated with the medium of the first grating element and two of the at least four boundaries are associated with the medium of the second grating element, the one grating zone interfacing with only one of these at least four boundaries.

26. A torque transducer as claimed in claim 2, wherein the transducer comprises two transmission paths, each of the two transmission paths passes through the first or second boundary of the at least one grating element.

* * * * *